United States Patent
Kim et al.

(10) Patent No.: US 12,153,235 B2
(45) Date of Patent: Nov. 26, 2024

(54) PEARL-INSPIRED HYPERSPECTRAL FILTER ARRAYS

(71) Applicant: Purdue Research Foundation, West Lafayette, IN (US)

(72) Inventors: Young L Kim, West Lafayette, IN (US); Yunsang Kwak, Gyeongsangbuk-do (KR); Jungwoo Leem, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 501 days.

(21) Appl. No.: 17/518,386

(22) Filed: Nov. 3, 2021

(65) Prior Publication Data
US 2022/0146727 A1    May 12, 2022

Related U.S. Application Data

(60) Provisional application No. 63/110,494, filed on Nov. 6, 2020.

(51) Int. Cl.
   *G02B 5/28*    (2006.01)
(52) U.S. Cl.
   CPC .................... *G02B 5/285* (2013.01)
(58) Field of Classification Search
   CPC ...................................... G02B 5/285
   USPC ................... 359/359, 586; 349/105
   See application file for complete search history.

(56) References Cited

U.S. PATENT DOCUMENTS 9,600,621 B2 * 3/2017 Perkins ............... G06F 30/398

OTHER PUBLICATIONS

Localization-delocalization transition of photons in one-dimensional random n-mer dielectric system, by Zhao et al, Physical Review B, 75, 165117 (Year: 2007).*
Tuchin, Tissue optics: Light scattering methods and instruments for medical diagnosis (SPIE—The International Society for Optical Engineering, 2015).
Tao et al., "Silk materials—a road to sustainable high technology," Advanced Materials 24, 2824-2837 (2012).
Kim et al., "Silk inverse opals," Nature Photonics 6, 817-822 (2012).
Leem et al., "Green-light-activated photoreaction via genetic hybridization of far-red fluorescent protein and silk," Advanced Science 5, 1700863 (2018).
Leem et al., "Scalable and continuous nanomaterial integration with transgenic fibers for enhanced photoluminescence," Materials Horizons 4, 281-289 (2017).
Stafford et al., "A buckling-based metrology for measuring the elastic moduli of polymeric thin films," Nature Materials 3, 545-550 (2004).

(Continued)

*Primary Examiner* — Audrey Y Chang
(74) *Attorney, Agent, or Firm* — Piroozi-IP, LLC

(57) ABSTRACT

An Anderson localized hyperspectral filter array is disclosed which includes a base layer and a plurality of optical layers deposited on the base layer selected from two or more materials, each material having a refractive index that is different from the other materials of the two or more materials, wherein no consecutively deposited optical layers have the same refractive index, each of the plurality of optical layers having a thickness chosen based on a random number within a predetermined range.

22 Claims, 28 Drawing Sheets
(24 of 28 Drawing Sheet(s) Filed in Color)

(56) References Cited

OTHER PUBLICATIONS

Shen et al., "Random lasing action in a polydimethylsiloxane wrinkle induced disordered structure," Applied Physics Letters 105, 021106 (2014).
Ahmed et al., "High aspect ratio wrinkles on a soft polymer," Soft Matter 6, 5709-5714 (2010).
Kim et al., "Coherent backscattering spectroscopy," Optics Letters 29, 1906-1908 (2004).
Kim et al., "Depth-resolved low-coherence enhanced backscattering," Optics Letters 30, 741-743 (2005).
Kim et al., "Low-coherence enhanced backscattering: Review of principles and applications for colon cancer screening," Journal of Biomedical Optics 11, 041125 (2006).
Kim et al., "Circular polarization memory effect in low-coherence enhanced backscattering of light," Optics Letters 31, 2744-2746 (2006).
Kim et al., "Origin of low-coherence enhanced backscattering," Optics Letters 31, 1459-1461 (2006).
Kim et al., "Maximal energy transport through disordered media with the implementation of transmission eigenchannels," Nature Photonics 6, 581-585 (2012).
Shi et al., "Microwave conductance in random waveguides in the cross-over to Anderson localization and single-parameter scaling," Proceedings of the National Academy of Sciences of the United States of America 111, 2926-2930 (2014).
Jang et al., "Wavefront shaping with disorder-engineered metasurfaces," Nature Photonics 12, 84-90 (2018).
Gollisch et al., "Eye smarter than scientists believed: Neural computations in circuits of the retina," Neuron 65, 150-164 (2010).
Cronin et al., "Multichannel spectrometers in animals," Bioinspiration & Biomimetics 13, 021001 (2018).
Wang et al., "Controlling random lasing with three-dimensional plasmonic nanorod metamaterials," Nano Letters 16, 2471-2477 (2016).
Chandrasekar et al., "Lasing action with gold nanorod hyperbolic metamaterials," ACS Photonics 4, 674-680 (2017).
Albada et al., "Observation of weak localization of light in a random medium," Physical Review Letters 55, 2692-2695 (1985).
Wolf et al., "Weak localization and coherent backscattering of photons in disordered media," Physical Review Letters 55, 2696-2699 (1985).
Wiersma et al., "Localization of light in a disordered medium," Nature 390, 671-673 (1997).
Skipetrov et al., "Red light for Anderson localization," New Journal of Physics 18, 021001 (2016).
Choi et al., "Hybridized/coupled multiple resonances in nacre," Physical Review B 89, 035115 (2014).
Choi et al., "Excitation of multiple resonances in 1D Anderson localized systems for efficient light amplification," Optics Letters 40, 847-850 (2015).
Choi et al., "Graphene-on-silver substrates for sensitive surface plasmon resonance imaging biosensors," Optics Express 19, 458-466 (2010).
Tseng et al., "Simulation of enhanced backscattering of light by numerically solving maxwell's equations without heuristic approximations," Optics Express 13, 3666-3672 (2005).
Song et al., "Random lasing in bone tissue," Optics Letters 35, 1425-1427 (2010).
Choi et al., "Random lasing mode alterations by single-nanoparticle perturbations," Applied Physics Letters 100, 041101 (2012).
Mellbring et al., "Spin coating and characterization of thin high-density polyethylene films," Macromolecules 34, 7496-7503 (2001).
Xu et al., "Spectroscopic visualization of nanoscale deformation in bone: Interaction of light with partially disordered nanostructure," Journal of Biomedical Optics 15, 060503 (2010).
Song et al., "Perturbation of nanoparticle on deformed microcavity," Journal of Lightwave Technology 28, 2818-2821 (2010).
Song et al., "Random laser spectroscopy for nanoscale perturbation sensing," Optics Letters 35, 2624-2626 (2010).
Song et al., "Detection of nanoscale structural changes in bone using random lasers," Biomedical Optics Express 1, 1401-1407 (2010).
Choi et al., "The potential of naturally occurring lasing for biological and chemical sensors," Biomedical Engineering Letters 4, 201-212 (2014).
Guo et al., "Compressed sensing in photoacoustic tomography in vivo," Journal of Biomedical Optics 15, 021311 (2010).
Willett et al., "Compressed sensing for practical optical imaging systems: A tutorial," Optical Engineering 50, 072601 (2011).
Dubois et al., "IR spectroscopy—in clinical and diagnostic applications," Analytical Chemistry 76, 361a-367a (2004).
Stuart, Infrared spectroscopy: Fundamentals and applications (Wiley, 2005).
Petibois et al., "Clinical application of FTIR imaging: New reasons for hope," Trends in Biotechnology 28, 495-500 (2010).
Baker et al., "Using Fourier Transform IR spectroscopy to analyze biological materials," Nature Protocols 9, 1771-1791 (2014).
Baker et al., "Developing and understanding biofluid vibrational spectroscopy: A critical review," Chemical Society Reviews 45, 1803-1818 (2016).
Rothschild, "The early development and application of FTIR difference spectroscopy to membrane proteins: A personal perspective," Biomedical Spectroscopy and Imaging 5, 231-267 (2016).
Jang et al., "Plasmonic superpixel sensor for compressive spectral sensing," IEEE Transactions on Geoscience and Remote Sensing 53, 3471-3480 (2015).
Jang et al., "Experimental demonstration of adaptive infrared multispectral imaging using plasmonic filter array," Scientific Reports 6, 34876 (2016).
Anderson, "Absence of diffusion in certain random lattices," Physical Review 109, 1492-1505 (1958).
Cao et al., "Random laser action in semiconductor powder," Physical Review Letters 82, 2278-2281 (1999).
Chabanov et al., "Statistical signatures of photon localization," Nature 404, 850-853 (2000).
Sapienza et al., "Cavity quantum electrodynamics with Anderson-localized modes," Science 327, 1352-1355 (2010).
Wang et al., "Transport through modes in random media," Nature 471, 345-348 (2011).
Sperling et al., "Direct determination of the transition to localization of light in three dimensions," Nature Photonics 7, 48-52 (2013).
Riboli et al., "Engineering of light confinement in strongly scattering disordered media," Nature Materials 13, 720-725 (2014).
Liu et al., "Random nanolasing in the anderson localized regime," Nature Nanotechnology 9, 285-289 (2014).
Choi et al., "Lasing interactions disclose hidden modes of necklaces states in the Anderson localized regime," ACS Photonics 5, 881-889 (2018).
Choi et al., "Anderson light localization in biological nanostructures of native silk," Nature Communications 9, 452 (2018).
Boas et al., Handbook of biomedical optics (CRC Press, 2011).
Meng et al., "In vivo optical-resolution photoacoustic computed tomography with compressed sensing," Optics Letters 37, 4573-4575 (2012).
Graff et al., "Compressive sensing in medical imaging," Applied Optics 54, C23-C44 (2015).
Gamez, "Compressed sensing in spectroscopy for chemical analysis," Journal of Analytical Atomic Spectrometry 31, 2165-2174 (2016).
Phillips et al., "Adaptive foveated single-pixel imaging with dynamic supersampling," Science Advances 3, e1601782 (2017).
Wagadarikar et al., "Single disperser design for coded aperture snapshot spectral imaging," Applied Optics 47, B44-B51 (2008).
Liutkus et al., "Imaging with nature: Compressive imaging using a multiply scattering medium," Scientific Reports 4, 05552 (2014).
Chakrabarti et al., "Speckle-based spectrometer," Optics Letters 40, 3264-3267 (2015).
French et al., "Speckle-based hyperspectral imaging combining multiple scattering and compressive sensing in nanowire mats," Optics Letters 42, 1820-1823 (2017).
Kohlgraf-Owens et al., "Transmission matrices of random media: Means for spectral polarimetric measurements," Optics Letters 35, 2236-2238 (2010).

(56) References Cited

OTHER PUBLICATIONS

Redding et al., "Compact spectrometer based on a disordered photonic chip," Nature Photonics 7, 746-751 (2013).
Redding et al., "High-resolution and broadband all-fiber spectrometers," Optica 1, 175-180 (2014).
Wan et al., "High-resolution optical spectroscopy using multimode interference in a compact tapered fibre," Nature Communications 6, 7762 (2015).
Yang et al., "Fast l1-minimization algorithms and an application in robust face recognition: A review," 2010 IEEE International Conference on Image Processing, 1849-1852 (2010).
Donoho, "Compressed sensing," IEEE Transactions on Information Theory 52, 1289-1306 (2006).
Baraniuk, "Compressive sensing," IEEE Signal Processing Magazine 24, 118 (2007).
Duarte et al., "Spectral compressive sensing," Applied and Computational Harmonic Analysis 35, 111-129 (2013).
Figueiredo et al., "Gradient projection for sparse reconstruction: Application to compressed sensing and other inverse problems," IEEE Journal of Selected Topics in Signal Processing 1, 586-597 (2007).
Lapray et al., "Multispectral filter arrays: Recent advances and practical implementation," Sensors 14, 21626-21659 (2014).
Wang et al., "Concept of a high-resolution miniature spectrometer using an integrated filter array," Optics Letters 32, 632-634 (2007).
Kim et al., "Random lasing from structurally-modulated silk fibroin nanofibers," Scientific Reports 7, 4506 (2017).
Konger et al., "Spatiotemporal assessments of dermal hyperemia enable accurate prediction of experimental cutaneous carcinogenesis as well as chemopreventive activity," Cancer Research 73, 150-159 (2013).
Xu et al., "Back-directional gated spectroscopic imaging for diffuse light suppression in high anisotropic media and its preclinical applications for microvascular imaging," IEEE Journal of Selected Topics in Quantum Electronics 16, 815-823 (2010).
Kim et al., "Data-driven imaging of tissue inflammation using RGB-based hyperspectral reconstruction toward personal monitoring of dermatologic health," Biomedical Optics Express 8, 5282-5296 (2017).
Kim et al., "Toward laboratory blood test-comparable photometric assessments for anemia in veterinary hematology," Journal of Biomedical Optics 21, 107001 (2016).
Kim et al., "Nonspectroscopic imaging for quantitative chlorophyll sensing," Journal of Biomedical Optics 21, 16008 (2016).
Choi et al., "Revisitation of ZnO random lasers toward optical security," in Conference on Lasers and Electro-Optics, OSA Technical Digest (online) (Optica Publishing Group, 2018), paper JW2A.107.
Li et al., "A Near-Infrared Miniature Quantum Dot Spectrometer," Advanced Optical Materials, 2100376 (2021).
Redding et al., "All-fiber spectrometer based on speckle pattern reconstruction," Optics Express 21, 6584-6600 (2013).
Bao et al., "A colloidal quantum dot spectrometer," Nature 523, 67-70 (2015).
Yang et al., "Single-nanowire spectrometers," Science 365, 1017-1020 (2019).
Gan et al., "A high-resolution spectrometer based on a compact planar two dimensional photonic crystal cavity array," Applied Physics Letters 100, 231104 (2012).
Wang et al., "Single-shot on-chip spectral sensors based on photonic crystal slabs," Nature Communications 10, 1-6 (2019).
Kim et al., "Fabrication of 2D thin-film filter-array for compressive sensing spectroscopy," Optics and Lasers in Engineering 115, 53-58 (2019).
Wang et al., "Spectral analysis based on compressive sensing in nanophotonic structures," Optics Express 22, 25608-25614 (2014).
Strudley et al., "Mesoscopic light transport by very strong collective multiple scattering in nanowire mats," Nature Photonics 7, 413-418 (2013).
Andreoli et al., "Deterministic control of broadband light through a multiply scattering medium via the multispectral transmission matrix," Scientific Reports 5, 1-8 (2015).
Yang et al., "Compact spectrometer based on a frosted glass," IEEE Photonics Technology Letters 29, 217-220 (2016).
Monakhova et al., "Spectral DiffuserCam: Lensless snapshot hyperspectral imaging with a spectral filter array," Optica 7, 1298-1307 (2020).

\* cited by examiner

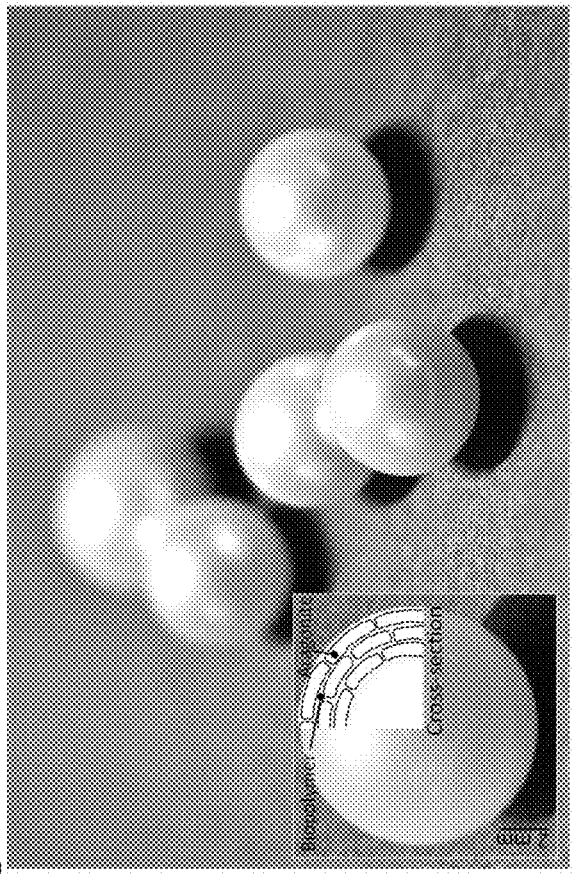
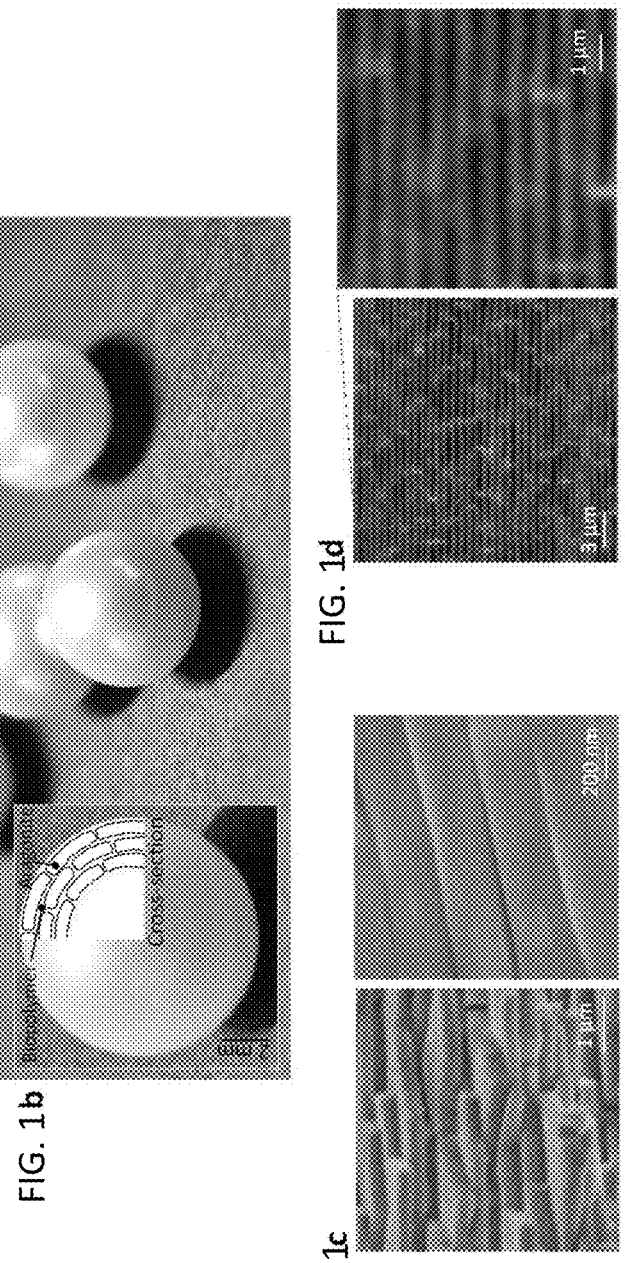
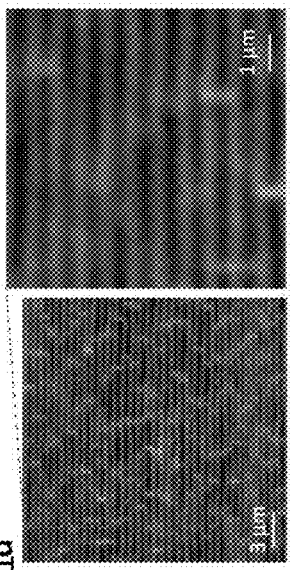
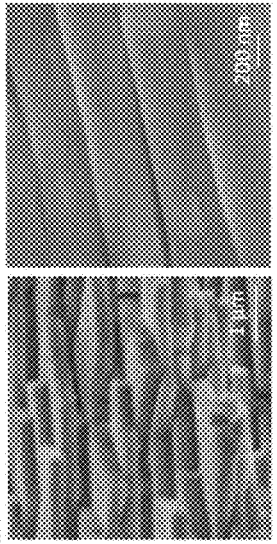
FIG. 1a
FIG. 1b
FIG. 1c
FIG. 1d

PEARL-INSPIRED HYPERSPECTRAL FILTER ARRAYS

CROSS-REFERENCE TO RELATED APPLICATIONS

This application is related to and claims the priority benefit of U.S. Provisional Patent Application having Ser. No. 63/110,494 titled "PEARL-INSPIRED HYPERSPECTRAL FILTER ARRAYS" which was filed Nov. 6, 2020, the contents of which are hereby incorporated by reference in its entirety into the present disclosure.

STATEMENT REGARDING GOVERNMENT FUNDING

This invention was made with government support under FA2386-17-1-4072 awarded by US Air Force Office of Scientific Research. The government has certain rights in the invention.

TECHNICAL FIELD

The present disclosure generally relates to spectrometers and hyperspectral imagers, and in particular, to a pearl-inspired hyperspectral filter arrays.

BACKGROUND

This section introduces aspects that may help facilitate a better understanding of the disclosure. Accordingly, these statements are to be read in this light and are not to be understood as admissions about what is or is not prior art.

Based on the proposition that classical or quantum signals are compressible, compressive (or compressed) sensing (CS) utilized in quantum signal processing and data compression heavily relies on random and incoherent sparsity. Importantly, CS has allowed a paradigm shift in classical and quantum information processing. In particular, imaging applications at a sub-Nyquist sampling rate significantly reduce the number of necessary measurements. In this case, the major requirements include random and sparse sampling, which is typically performed by a numerical means. Such approaches often rely on additional hardware components (e.g. a digital micromirror device) and the randomness is generated on a computer has limited entropy.

Fundamentally, CS and super resolution imaging are two sides of the same coin; super resolution solves an ill-posed problem as an inverse mapping from a subsampled space to a dense space. The concept of super resolution has further been extended to the frequency domain such that high resolution spectral data are numerically recovered using a small number of actual observations (or readings). The combination of nanophotonic and plasmonic devices with CS theory has been applied to reduce the physical dimension of large and bulky spectrometry and hyperspectral imaging systems. Such implementations require advanced fabrications of nanomaterials and nanostructures in which unavoidable variations and imperfections are often bottlenecks for actually constructing the designed photonic devices. As speckle patterns of light through scattering media are sensitive to the incident wavelength, light scattering and random lasing in irregular complex media have also received attention for compressive sampling. Multiple light scattering CS approaches often rely on bulky scattering media or long optical fibers. A compressive sampling approach of combining spatial and spectral randomness has also been proposed to construct a sensing matrix. On the other hand, it is challenging to form a sensing matrix to achieve a high degree of incoherence in both of the spatial and frequency domains for compressive sampling. To further demonstrate these challenges, reference is made to Table 1, below. As a result, a thin and compact form factor, which can simply be attachable to a commercially available image sensor, has not yet been demonstrated.

TABLE S1

Brief comparisons of light scattering-based computational spectroscopy

| Method | Sensing matrix | Spectral resolution/ spectral range | Reading density[a] |
|---|---|---|---|
| Light localized sample (i.e. pearl) | Spatial and spectral features | 7.4 nm/250 nm | 0.06 |
| Photonic chip | Spectral features | 0.5 nm/25 nm | 0.25 |
| Colloidal quantum dot | Spectral features | 2 nm/300 nm | 0.65 |
| Multiple nanowire | Spatial and spectral features | 0.5 nm/45 nm | >1 |
| 2D filter array | Spectral features | 1.4 nm/500 nm | 0.07 |
| Nanowire | Spectral features | 10 nm/130 nm | 0.6 |
| Photonic crystal slab | Spectral features | 1.5 nm/200 nm | 0.18 |
| Multiply scattering medium | Spatial features | — | >0.3 |
| Multi-core fiber | Spatial features | — | 0.05[b] |
| Multimode fiber | Spatial features | — | 0.09[b] |
| Diffuser and color filter | Spatial and spectral features | 5 nm/500 nm | 1 |

[a]Ratio of the number of readings to reconstructed data points.
[b]Reconstruction of sparse images.

Therefore, there is an unmet need for a novel hyperspectral filter array that can address the sub-Nyquist needs for CS applications of spectrometers and hyperspectral imagers.

SUMMARY

An Anderson localized hyperspectral filter array is disclosed. The filter includes a base layer and a plurality of optical layers deposited on the base layer selected from two or more materials, each material having a refractive index that is different from the other materials of the two or more materials, wherein no consecutively deposited optical layers have the same refractive index, each of the plurality of optical layers having a thickness chosen based on a random number within a predetermined range.

Another Anderson localized hyperspectral filter array is also disclosed. The filter includes a base layer, and a plurality of optical layers deposited on the base layer randomly selected from a plurality of materials, each material having a refractive index that is different from the other materials of the plurality of materials, wherein no consecutively deposited optical layers have the same refractive index, each of the plurality of optical layers having a thickness chosen based on a random number within a predetermined range

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 1a-1d are photographs (FIG. 1a), schematics (FIG. 1b), scanning electron microscopy (SEM) images (FIG. 1c), and confocal microscopy images (FIG. 1d) are provided to illustrate robust light localization in pearls.

FIG. 2a is a graph of normalized intensity vs. angular profiles in degrees representing measured angular profiles in the far-field through akoya pearls with three different thicknesses, FIG. 2b is a graph of the real part of an internal field correlation function in the near field vs. Δx (in mm) which is the spatial correlation bandwidth estimated by the inverse Fourier transform of the angular profiles, and FIG. 2c is a graph of normalized intensity vs. x (in mm) which provides transverse broadening of the incident beam on the output plane of the pearl.

FIG. 6b includes 4 panels (i, ii, iii, and iv) which represent computed transmission spectra and corresponding phases for the pearl thickness L=20 μm (i), 40 μm (ii), 60 μm (iii), and 80 μm (iv).

FIG. 9b shown over two consecutive pages provide measured transmission spectra of the selected spots in the spectrally averaged transmission map of FIG. 9a.

FIGS. 13a and 13b provide comparisons between simulated and measured transmission spectra; specifically, FIG. 13a provides representative computed transmission spectrum, incorporating the optical and morphological properties of akoya nacre (pearl's internal substance) and the spectral resolution of the imaging spectrograph, and FIG. 13b provides Fourier transforms of the transmission spectra shown in FIG. 13a.

FIG. 16a depicts four bases that are used in FIG. 9b (#2, #6, #10, and #14), while FIG. 16b depicts nine bases that are used in FIG. 9b (#2, #3, #6, #8, #10, #11, #12, #14, and #16).

DETAILED DESCRIPTION

Figure 2C:
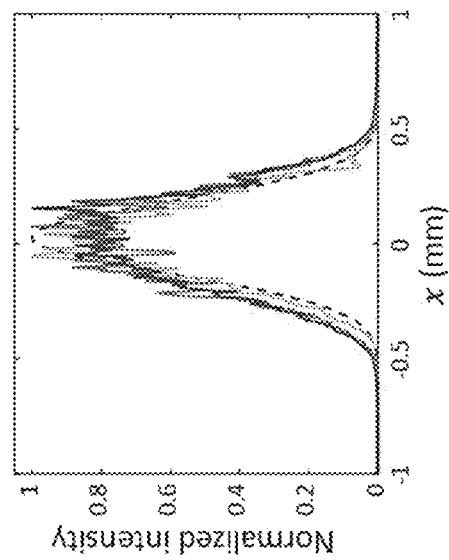
FIGS. 2a-2c provide characterizations of light transport (light field) dimensionality in akoya pearls; specifically.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel hyperspectral filter array with an irregular multilayered structure is presented that can address the sub-Nyquist needs for compressed sensing (CS) applications for computational spectrometers and hyperspectral imagers. Light localization at the Anderson transition can be an entropy source for performing compressive sampling in the frequency domain as light propagates through a strongly scattering passive random medium. Towards this end, intrinsic characteristics of strong light localization can be used for spectral compressive sampling. Strong light localization simply offers a sensing matrix with spatial and spectral incoherence simultaneously that would otherwise be difficult to achieve for compressive sampling. Specifically, it can provide an unlimited set of incoherent bases in the frequency domain, owing to the binary, diverse, and stochastic nature of strongly localized modes. Mediated by the excitation of complex states inside Anderson-localized media, transmission quantities are described by affluent intensity fluctuations. Outgoing waves are governed by off- or on-resonance with localized modes (i.e. binary characteristic). As a consequence, transmission spectra have multiple discrete narrow peaks in the Anderson localized regime. Numerous open channels with high transmission eigenvalues are formed, resulting in resonant tunneling (transmission eigenchannels). Taking all of the characteristics of strong light localization into account, a light localized random medium is a strong candidate of spectral information processing at a material level for compressive sampling in the frequency domain Pearls and nacre (pearl's internal substance and also known as mother-of-pearl) have favorable features for forming strong localized modes, as dimensionality plays a critical role in light propagation and localization. Light localization proximal to the Anderson regime can be observed in low-dimensional natural samples even with a weak refractive index contrast. Transmission in a highly multilayered system is governed by the excitation of single resonance states and occasionally multiple resonances hybridized in space (also known as necklace states), offering diverse bases for compressing sampling.

A natural or cultured pearl has a large number of alternating layers of crystalline aragonite and organic macromolecules (e.g. conchiolin) with a brick-and-mortar structure. Referring to FIGS. 1a-1d, photographs, schematics, scanning electron microscopy (SEM) images, and confocal microscopy images are provided to illustrate robust light localization in pearls. Specifically, FIG. 1a provides a photograph of high-grade akoya pearls. The vibrant, sparkling, and bright reflection with a white and cream body color is the hallmark of akoya pearls. FIG. 1b, provides a schematic representing cross-sectional illustration of a pearl. Crystalline nacre is composed of aragonite platelets bound together with organic macromolecules (biopolymer). FIG. 1c provides SEM images of the brick-and-mortar nanostructure of pearls at different magnifications. FIG. 1d provides confocal microscopy images of a deproteinized pearl infiltrated with a fluorescent dye (Rhodamine 6G), also at different magnifications. FIGS. 1c and 1d reveal the exquisite irregular multilayered nanostructures of pearls with a very large number of layers. It should be noted that the thickness of aragonite platelets is comparable to the wavelength of light ($\lambda$).

Aragonite which has a refractive index n of about 1.66 at 575 nm wavelength, which is one of the highest-refractive-index natural materials with minimal light absorption; aragonite is the most common crystallization of calcium carbonate ($CaCO_3$). As provided in FIGS. 1c and 1d, the thickness of aragonite layers in akoya pearls is comparable to the wavelength of light $\lambda$; the average thickness is 562 nm. As a naturally formed nanostructure, the arrangement of aragonite layers is not perfectly periodic; the thickness variation is relatively significant with a standard deviation (SD) of 9.7 nm (17% of the average thickness). The number of layers can be extremely large (e.g. about 10,000 layers in a 5-mm thick pearl sample), which would be beyond the capability of typical nanofabrication methods.

Figure 2B:
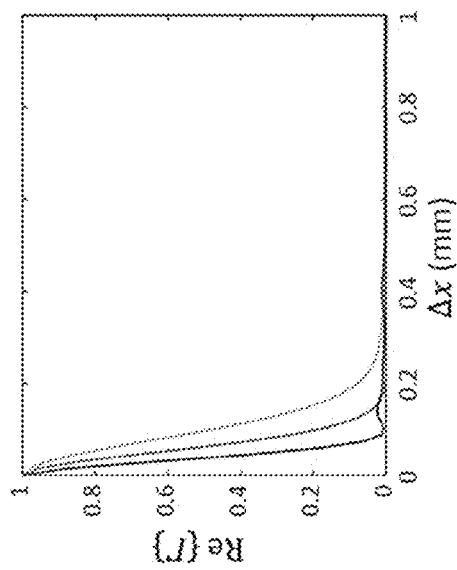
Figure 2A:
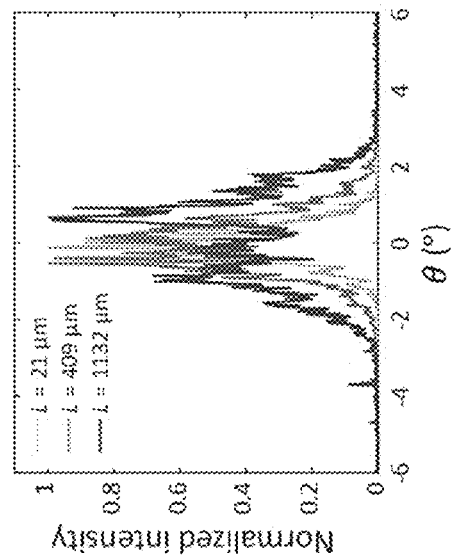
Figure 3:
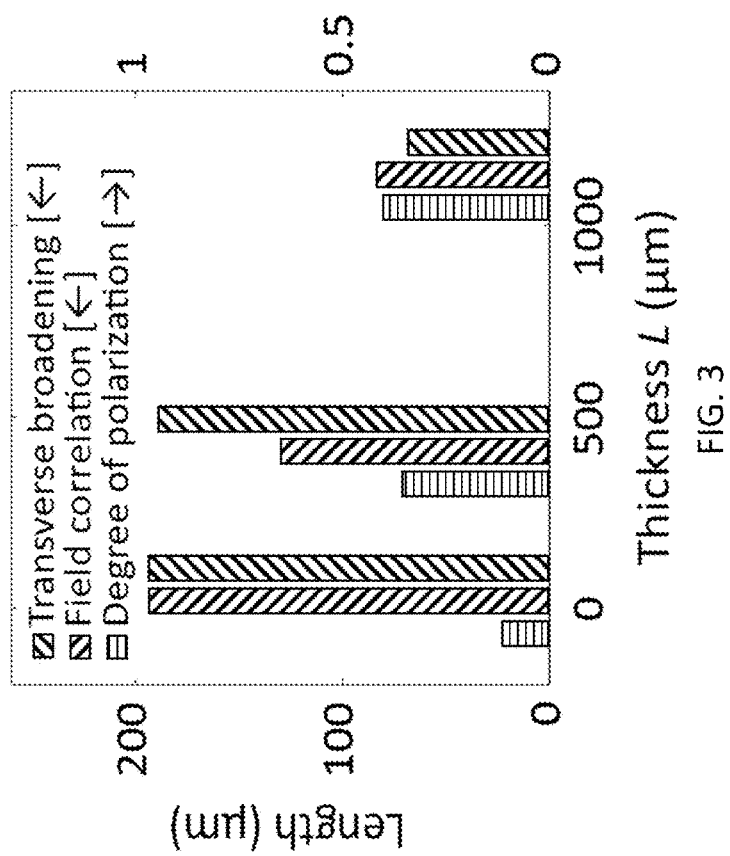
FIG. 3 is a bar graph of length (in μm) vs. thickness in (μm) which provides characterizations of light transport dimensionality using the field correlation length inside the pearl, the transverse broadening of the incident beam, and the degree of linear polarization.

Another advantageous feature of pearls is that the low dimensionality of light transport is highly retained to an extent. Because aragonite layers are not morphologically uniform in the transverse plane, the dimensionality continuously varies with an increase in the pearl thickness L. Such transverse disorder on a microscale can easily induce decoherence and reduce the spatial coherence area, inadvertently increasing the light field dimensionality in the visible range. Thus, a pearl thickness (or the number of aragonite layers) is of interest that keeps the effective dimensionality close to one dimension (1D), by measuring the field correlation length (i.e. spatial coherence area within the pearl) and the transverse broadening of the incident illumination beam, as provided in FIGS. 2a-2c which provide characterizations of light transport (light field) dimensionality in akoya pearls. Specifically, FIG. 2a is a graph of normalized intensity vs. angular profiles in ° representing measured angular profiles in the far-field through akoya pearls with three different thicknesses. FIG. 2b is a graph of the real part of an internal field correlation function in the near field vs. $\Delta x$ (in mm) which is the spatial correlation bandwidth estimated by the inverse Fourier transform of the angular profiles. FIG. 2c is a graph of normalized intensity vs. x (in mm) which provides transverse broadening of the incident beam on the output plane of the pearl. The black dotted line is the incident beam on the input plane of the pearl. When the beam broadening is less than the field correlation length, light localization can be considered 1D; an effective number of transverse modes within the field correlation area is one. Surprisingly, the high-quality akoya pearl satisfies this condition as long as the number of layers is less than about 2000 (or L is less than about 1 mm), as shown in FIG. 3a, which is a bar graph of length (in μm) vs. thickness in (μm) which provides characterizations of light transport dimensionality using the field correlation length inside the pearl, the transverse broadening of the incident beam, and the degree of linear polarization. The dimensionality continuously varies as the pearl thickness L increases due to the transverse irregularity. However, the effective dimensionality remains close to 1D when L is less than about 1 mm, corresponding to about 2,000 aragonite layers, while the initial polarization state is well maintained when L is less than about 500 μm.

Figure 4A:
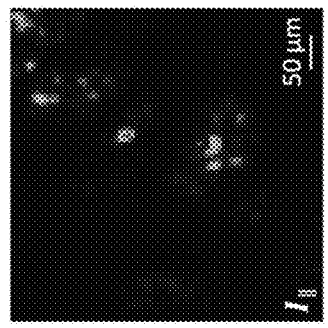
FIG. 4a provide characterizations of linear polarization of light through akoya pearls; specifically, measured spatial intensity maps with two polarized states parallel $I_∥$ (upper) and perpendicular $I_⊥$ (lower) to the polarization of the incident white-light illumination beam for L=21 μm is provided in FIG. 4a, for L=409 μm is provided in FIG. 4b, and for L=1132 μm is provided in FIG. 4c.
Figure 4A:
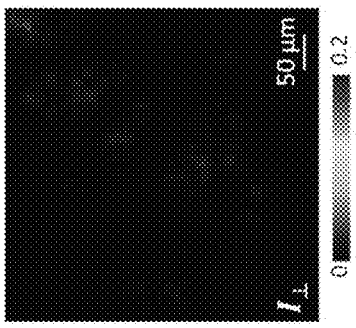
Figure 4B:
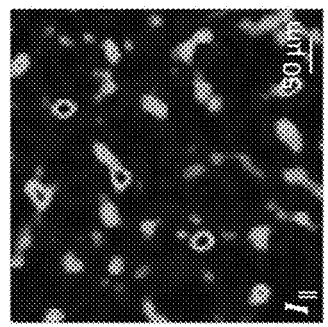
Figure 4B:
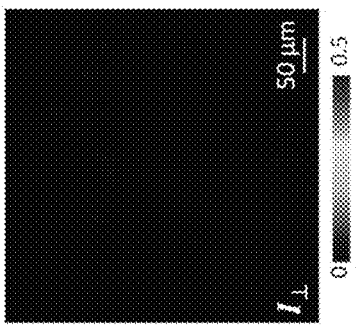
Figure 4C:
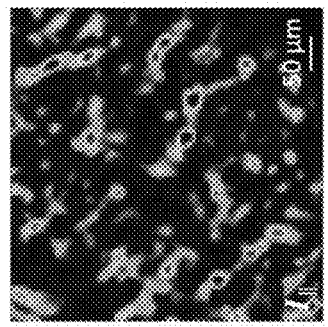
Figure 4C:
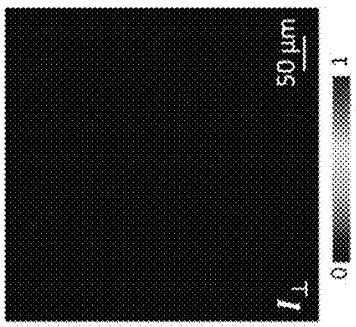

In addition, when linearly polarized light travels through the akoya pearl, the initial polarization state is well maintained for L=21 and 409 μm where the spatially averaged degree of linear polarization (DOLP) is calculated: DOLP=|I$_∥$−I$_⊥$|/(I$_∥$+I$_⊥$), where I$_∥$ and I$_⊥$ are the averaged intensity parallel and perpendicular to the incident polarization state, respectively, as shown in FIGS. 4a, 4b, and 4c, which provide characterizations of linear polarization of light through akoya pearls. Specifically, measured spatial intensity maps with two polarized states parallel I$_∥$ (upper) and perpendicular I$_⊥$ (lower) to the polarization of the incident white-light illumination beam for L=21 μm (FIG. 4a), 409 μm (FIG. 4b), and L=1132 μm (FIG. 4c) are provided. The degree of linear polarization (=|I$_∥$−I$_⊥$|/(I$_∥$+I$_⊥$)) is computed by I$_∥$ and I$_⊥$ and averaged in the area shown.

The present disclosure, thus provides a novel hyperspectral filter array design with an irregular multilayered structure that can be used to achieve sub-Nyquist CS based on a disorder-driven and Anderson localization nanofabrication techniques that can achieve randomized thicknesses as well as randomized material concentration (refractive index) in a layer-by-layer approach.

Figure 5B:
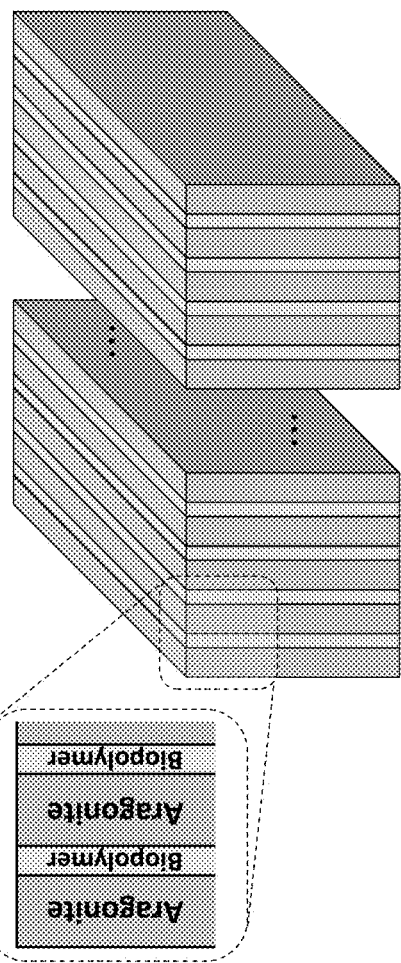
FIG. 5b provides a schematic of a simulated 1D system including alternating layers of crystalline aragonite and organic macromolecules (biopolymer).
Figure 5D:
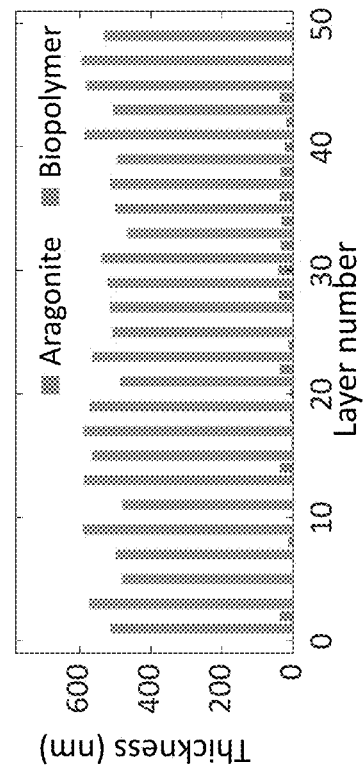
FIG. 5d provides a representative simulated thicknesses of aragonite and biopolymer layers for an akoya pearl with a thickness L of 21 μm, extracted from the confocal microscopy and SEM images provided in FIGS. 1c and 1d.
Figure 5A:
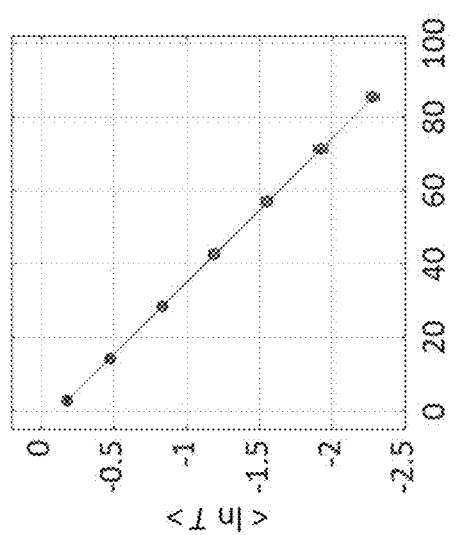
FIG. 5a provides computed average transmission <T> through the pearl as a function of L.
Figure 5C:
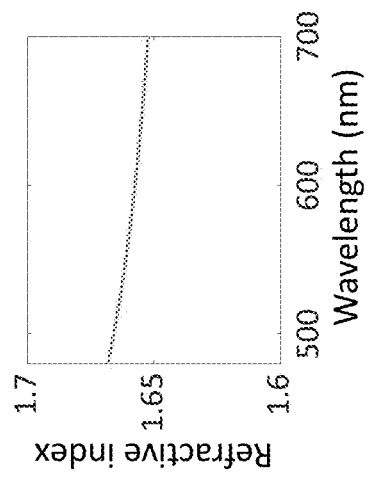
FIG. 5c provides a dispersion curve of crystalline aragonite.
Figure 6A:
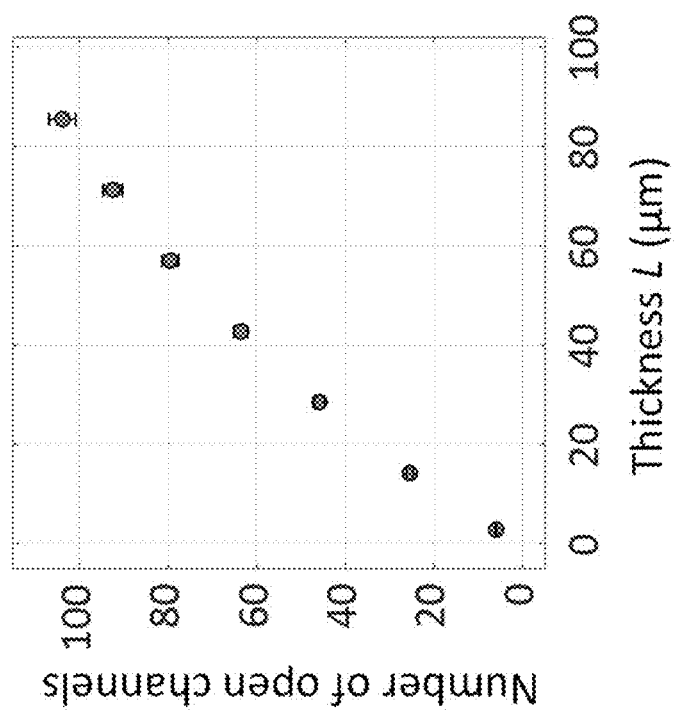
FIG. 6a provides a computed number of open channels with transmission eigenvalues (>1/e) as a function of L in a range of λ=450-700 nm. The high density of states provides a foundation that Anderson light localization can be a physical source for random and sparse sampling of spectral compressive sensing in the frequency domain.
Figure 6B:
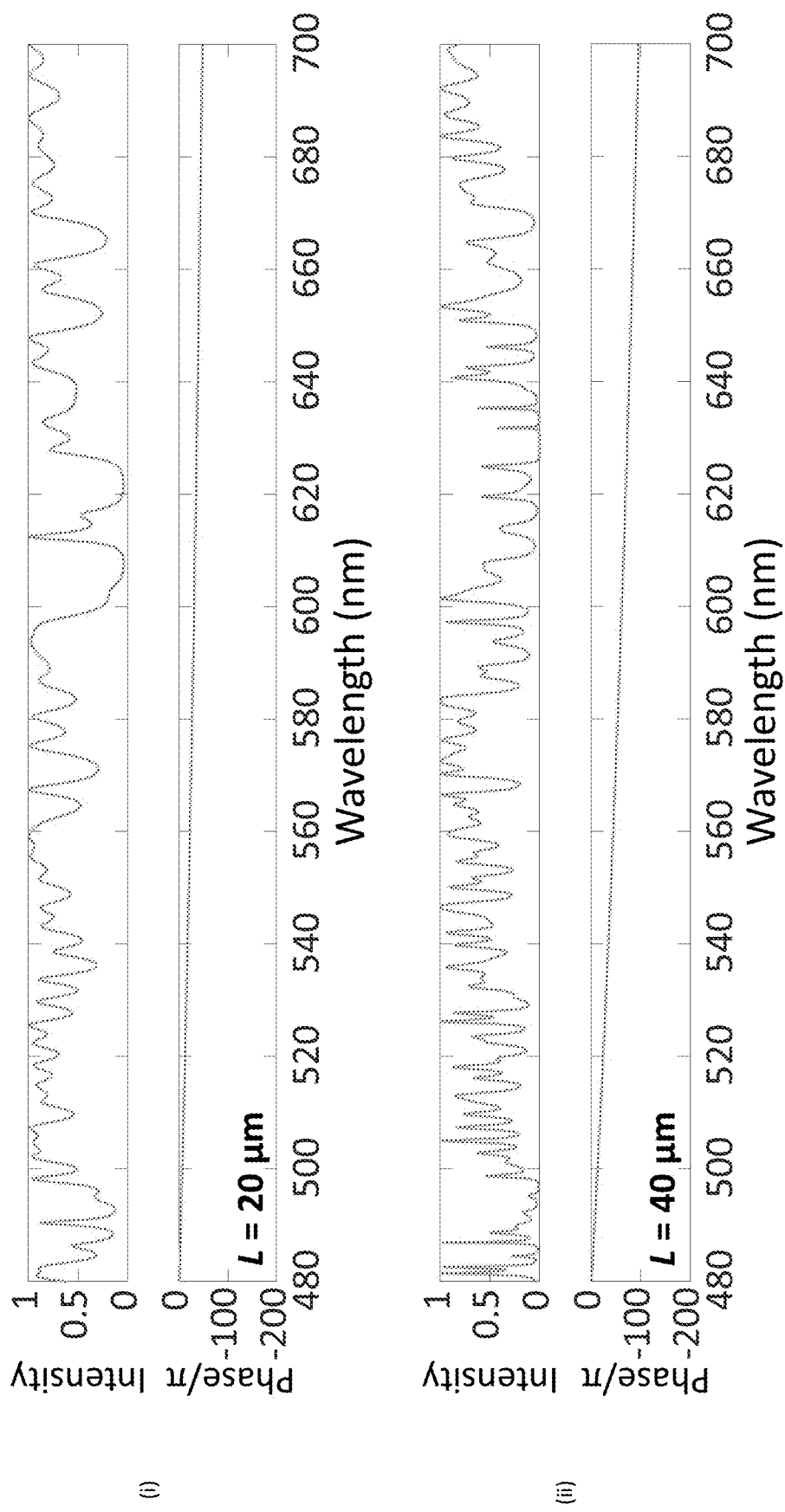
FIG. 6b presented over two consecutive pages having panels i, ii, iii, and iv provide representative computed transmission spectra and phases of akoya pearl-mimicking structures.
Figure 6B:
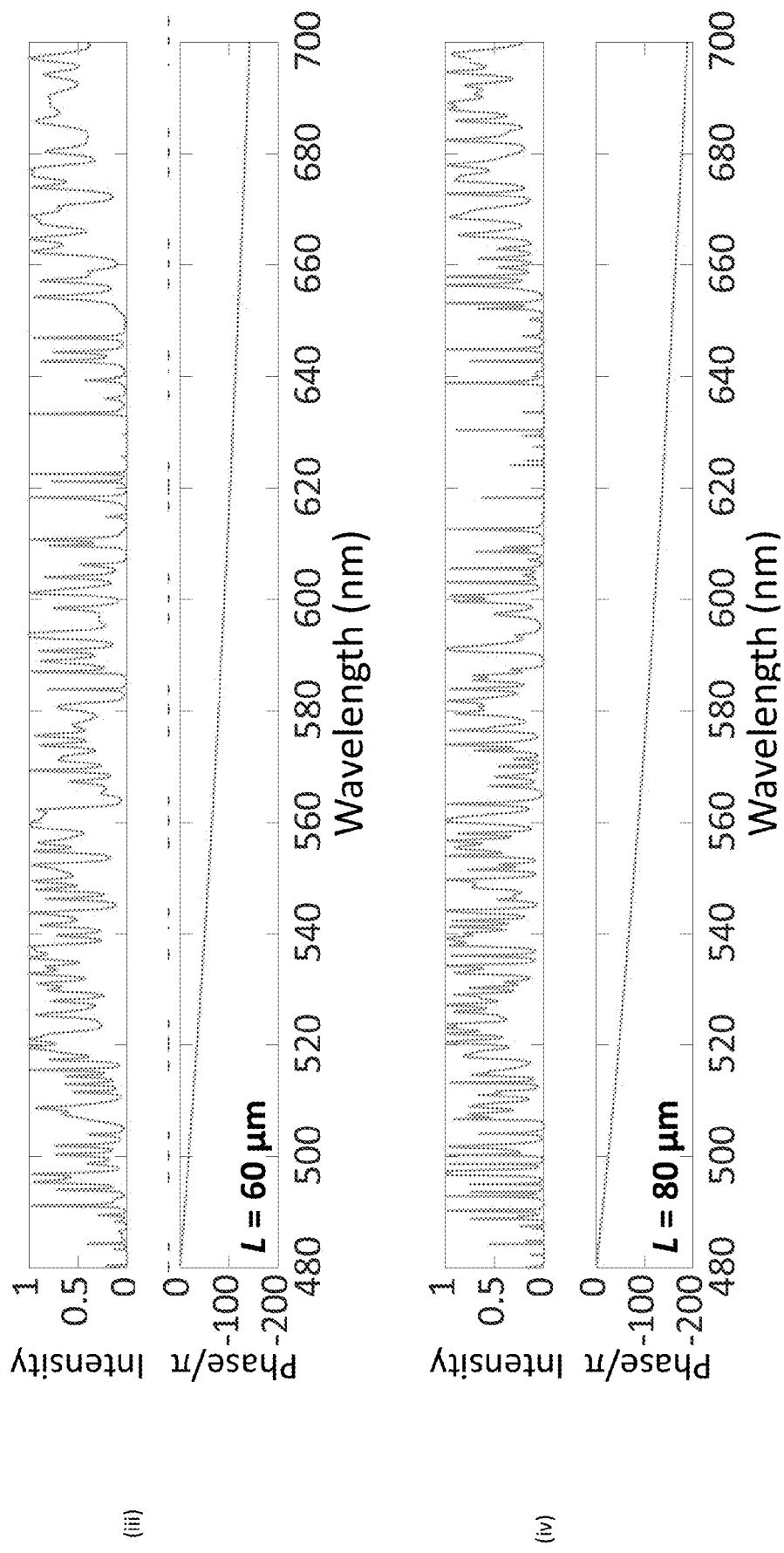
Figure 7B:
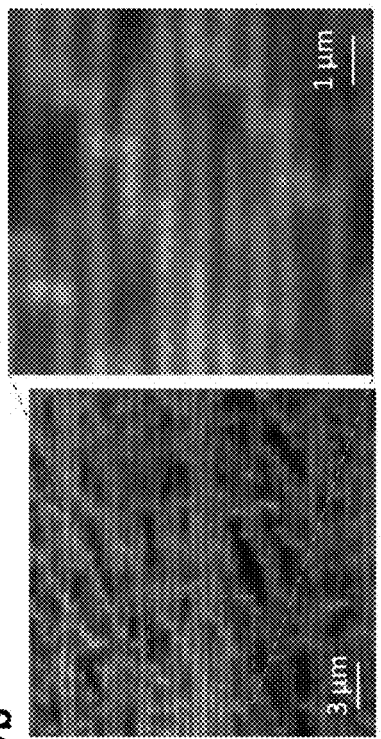
FIGS. 7a and 7b provide confocal microscopy images of high-grade (7a) and low-grade akoya pearls (7b).
Figure 7A:
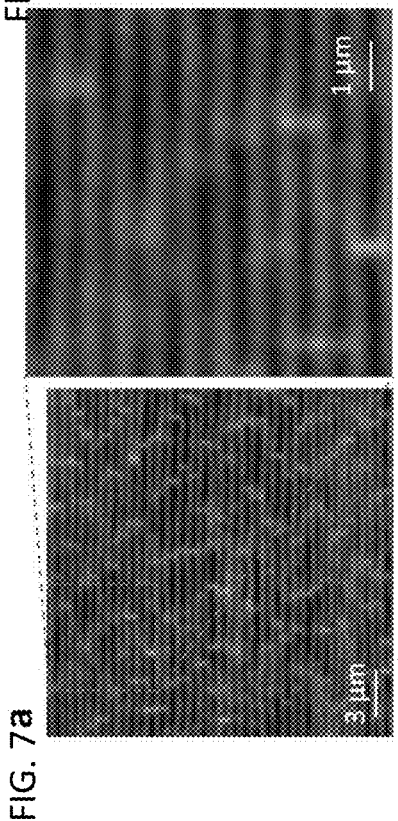
Figure 7D:
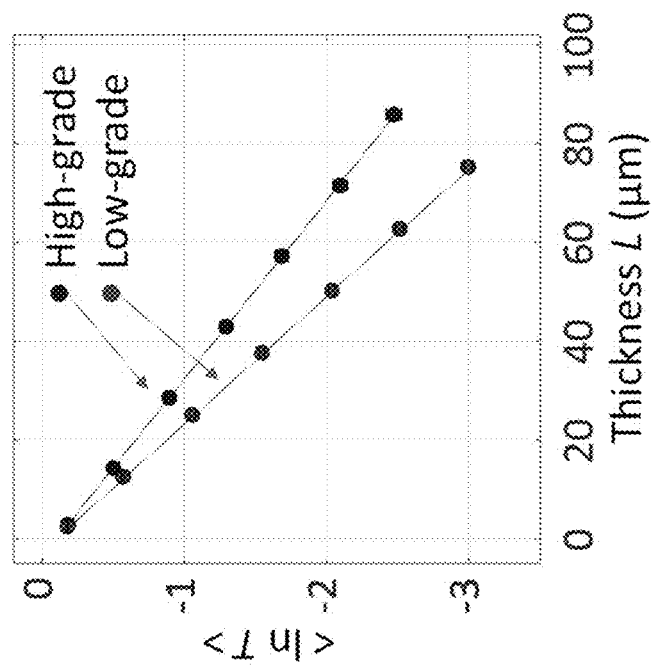
FIG. 7d is a graph of number of open channels vs. thickness (in μm) which provided computed number of open channels with transmission eigenvalues as a function of L in a range of λ=450-700 nm.
Figure 7C:
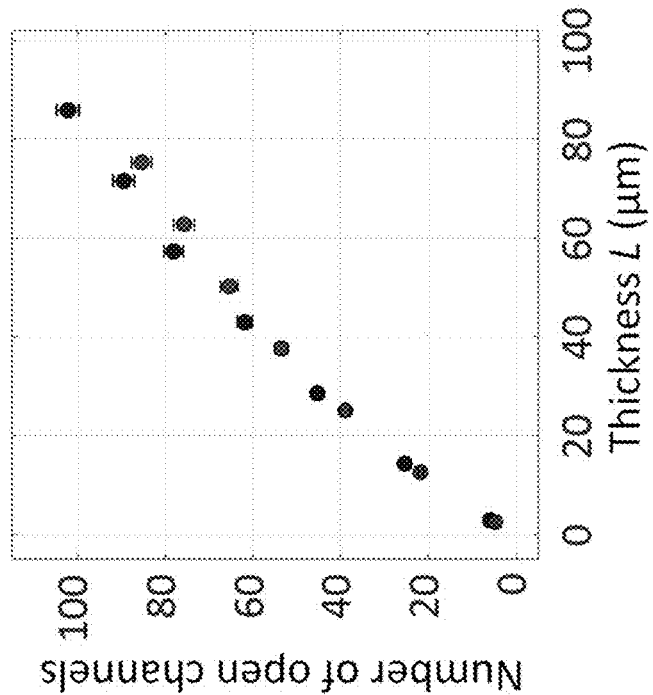
FIG. 7c is a graph of lnT vs. thickness (in μm) which provides averaged transmission values over 100 different realizations for the low-grade pearl return ξ=12.9 μm.

In a highly multilayered system with dominant longitudinal disorder (i.e. thickness variation along the light propagation direction), strong localization occurs once L becomes greater than the localization length of light ξ which is the Anderson localization length of light in the sample. In this case, an ensemble average transmission converges to a single exponential: $<\ln T> \approx -L/2\xi$, where T is the transmission in 1D (transmittance in general). An estimated ξ for the akoya pearls returns ξ=18.5 μm based on 1D numerical experiments using the parameters extracted from the confocal microscopy and SEM images, as provided in FIG. 5a which is a graph of ln T vs. thickness in (μm) and FIGS. 5b, 5c, and 5d, providing Simulation parameters for computed transmission spectra of akoya pearls. Specifically, FIG. 5a provides computed average transmission <T> through the pearl as a function of L. The decay over L converges to a single exponential and a fitting slope of $<\ln T> \approx -L/2\xi$ with the longitudinal localization length ξ returns ξ=18.5 μm. FIG. 5b provides a schematic of a simulated 1D system including alternating layers of crystalline aragonite and organic macromolecules (biopolymer). FIG. 5c provides a dispersion curve of crystalline aragonite. FIG. 5d provides a representative simulated thicknesses of aragonite and biopolymer layers for an akoya pearl with a thickness L of 21 μm, extracted from the confocal microscopy and SEM images provided in FIGS. 1c and 1d. As the light propagates through a pearl, the phase is rapidly randomized, resulting in short ξ, compared with the entire pearl size (e.g., 8.3 mm in diameter). Moreover, the number of open channels in a spectral range of λ=450-700 nm increases with L as provided in FIGS. 6a and 6b (panels i, ii, iii, and iv). Specifically, FIG. 6a provides a computed number of open channels with transmission eigenvalues (>1/e) as a function of L in a range of λ=450-700 nm. The high density of states provides a foundation that Anderson light localization can be a physical source for random and sparse sampling of spectral compressive sensing in the frequency domain. FIG. 6b (panels i, ii, iii, and iv) provide representative computed transmission spectra and phases of akoya pearl-mimicking structures. FIG. 6b includes 4 panels (i, ii, iii, and iv) which represent computed transmission spectra and corresponding phases for the pearl thickness L=20 μm (i), 40 μm (ii), 60 μm (iii), and 80 μm (iv). The 1D simulations are conducted using the parameters extracted from akoya pearls. As L increases, a large number of open channels (discrete peaks with high transmission intensity) emerge as the origin of diverse patterns of transmission spectra in akoya pearls. From a perspective of light localization, different qualities of pearls can result in different ξ. For example, a low-grade pearl has shorter ξ than that of the high-graded one, suggesting that the low-grade pearl has more irregular structures while the numbers of open channels (density of states) are similar, as provided in FIGS. 7a-7d, which provide comparisons between high-graded and low-graded pearls. Specifically, FIGS. 7a and 7b provide confocal microscopy images of high-grade (7a) and low-grade akoya pearls (7b). The aragonite and biopolymer thicknesses of the low-grade pearl are 450 nm±12% (SD) and 35 nm±30 nm, respectively. FIG. 7c is a graph of lnT vs. thickness (in μm) which provides averaged transmission values over 100 different realizations for the low-grade pearl return ξ=12.9 μm. FIG. 7d is a graph of number of open channels vs. thickness (in μm) which provided computed number of open channels with transmission eigenvalues as a function of L in a range of λ=450-700 nm. The low-grade pearl has slightly shorter ξ than that of the high-graded one, suggesting that the low-grade pearl has more irregular structures while the numbers of open channels (density of states) are similar. In such a highly multilayered system, all eigenchannels contribute to the density of states, but the transmission is dominated by open channels with transmission eigenvalues >1/e. These open transmission channels serve as an origin of diverse patterns in transmission spectra.

Figures 8A, 8B, 8C:
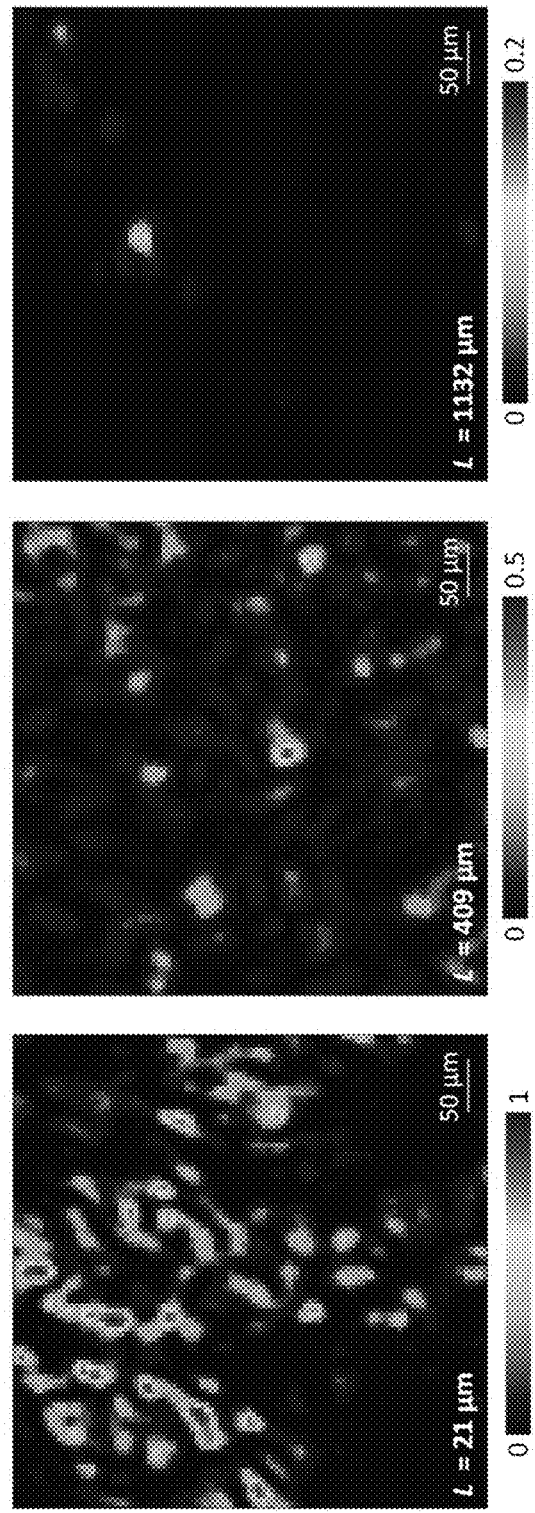
FIGS. 8a, 8b, and 8c provide a representation of stochastic spatial intensity fluctuations of speckle patterns through akoya pearls; specifically, FIGS. 8a-8c provide measured transmission intensity maps with a laser beam at 543.5 nm which show the transmission intensity of the speckle patterns through the akoya pearls with L=21 μm (FIG. 8a), 409 μm (FIG. 8b), and 1132 μm (FIG. 8c) when a collimated beam of a laser (HeNe laser at 543.5 nm) is illuminated on the surface.

Spatial intensity fluctuations in grossly suppressed transmission through akoya pearls not only support strong light localization, but also reveal the stochastic nature of resonant tunneling through localized modes. Referring to FIGS. 8a-8c, a representation of stochastic spatial intensity fluctuations of speckle patterns through akoya pearls are provided. Specifically, FIGS. 8a-8c provide measured transmission intensity maps with a laser beam at 543.5 nm which show the transmission intensity of the speckle patterns through the akoya pearls with L=21 μm (FIG. 8a), 409 μm (FIG. 8b), and 1132 μm (FIG. 8c) when a collimated beam of a laser (HeNe laser at 543.5 nm) is illuminated on the surface.

The pearl thickness that retains the low dimensionality is determined by measuring the field correlation length and the transverse broadening of the incident illumination. First, the field correlation length d in the near field is estimated with the pearl samples with L=21, 409, and 1132 μm. Because of the strong light localization in the pearls, the field correlation length from the spatial field correlation function is calculated in the near field. The spatial field correlation function Γ(Δx, Δy) within the sample can be estimated by the inverse Fourier transform of the angular distribution in the far field I($k_x$, $k_y$):

$$\Gamma(\Delta x,\Delta y)=\iint I(k_x,k_y)e^{i(k_x\Delta x+k_y\Delta y)}dk_x dk_y \quad (1)$$

where $k_x$ and $k_y$ are the circular wavenumbers in x and y coordinates, respectively. The angular distribution of the light transmitted through the pearl sample with a highly collimated laser beam (HeNe laser at 632.8 nm) was projected onto a CCD camera via a lens. The field correlation length was then calculated by twice the full width half maximum value in the real part of the spatial field correlation function. FIGS. 4a and 4b, discussed above, show the normalized angular distribution and the real part of the spatial field correlation function; d returns 193, 129, and 83 μm for L=21, 409, and 1132 μm, respectively. Second, the transverse broadening σ of the incident beam (diameter=940 μm and angular divergence=0.045°) is directly measured by imaging the output plane of the pearl sample with a CCD camera. The transverse intensity I(x) by integrating the measured intensity over y is then obtained. Referring back to FIG. 4c, the normalized transverse intensity distributions for the pearl samples with L=21, 409, and 1132 μm are provided. Thereafter, the transverse broadening of wave can be calculated:

$$\sigma=\sqrt{\sigma_{x_{out}}^2-\sigma_{x_{in}}^2} \quad (2)$$

where $\sigma_{x_{in\,or\,out}}^2=\int I_{x_{in\,or\,out}}(x)x^2\,dx$. σ returns 23.3, 71.3 and 80.7 μm for L=21, 409, and 1132 μm, respectively.

Figure 8D:
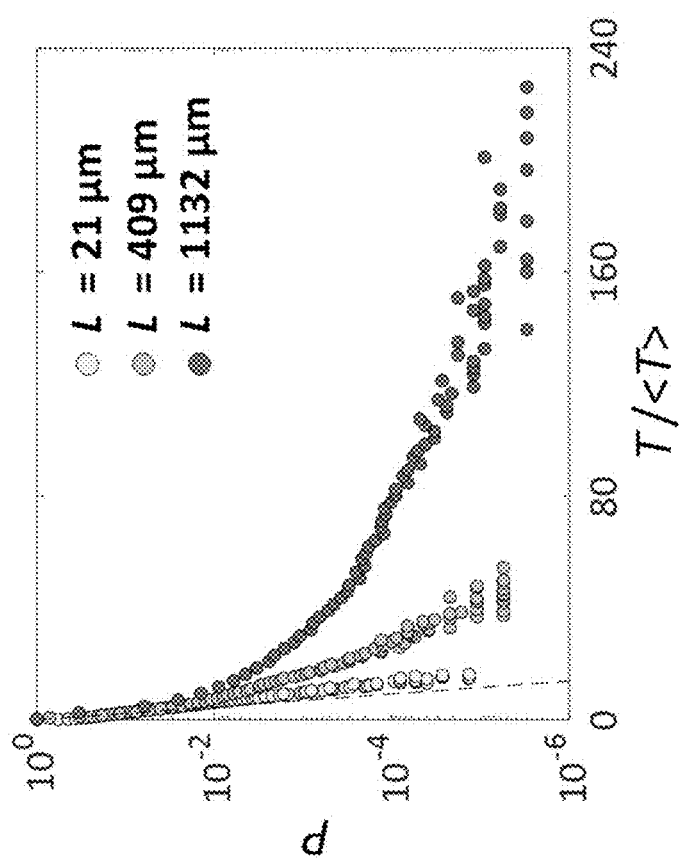
FIG. 8d provides how a probability distributions of the normalized transmission intensity p(T/<T>) significantly deviates from a Rayleigh distribution (negative exponential intensity statistics), in a graph of corresponding probability distributions of normalized transmission intensity T/<T>.
Figure 8G:
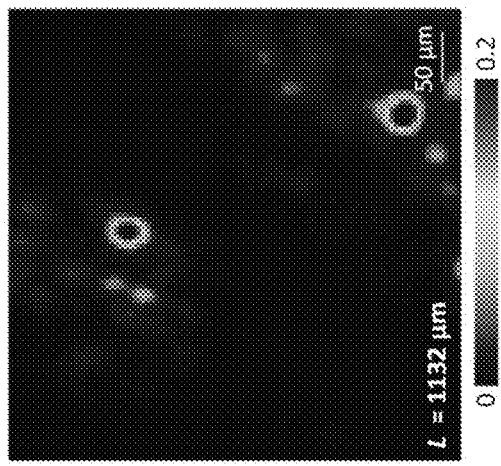
FIGS. 8e, 8f, and 8g provide spectrally averaged speckle patterns which are characterized through the same akoya pearls when a collimated (divergence angle θ=0.045° and transverse coherence length θ/λ=0.75 mm at λ=575 nm) white-light (λ=450-700 nm) beam is illuminated, resulting are shown in FIGS. 8e-8g, which are measured transmission intensity maps corollary to FIGS. 8a-8c.
Figure 8F:
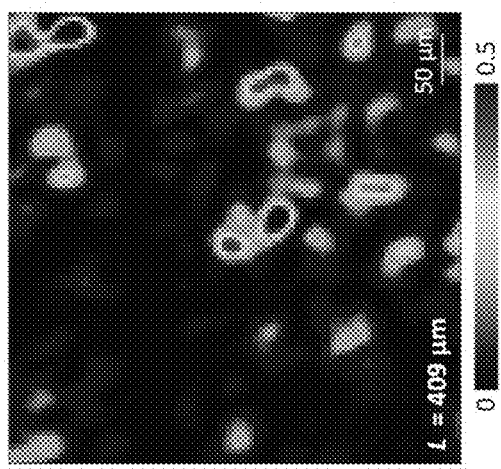
Figure 8E:
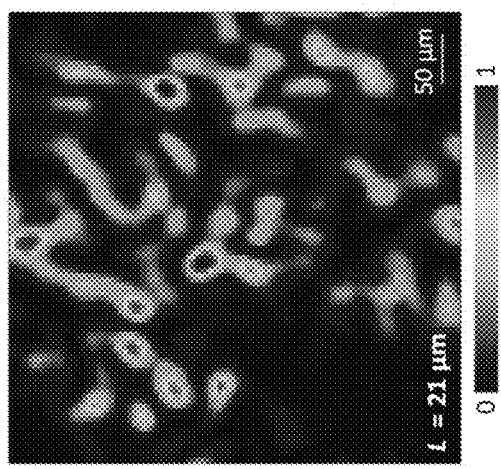
Figure 8H:
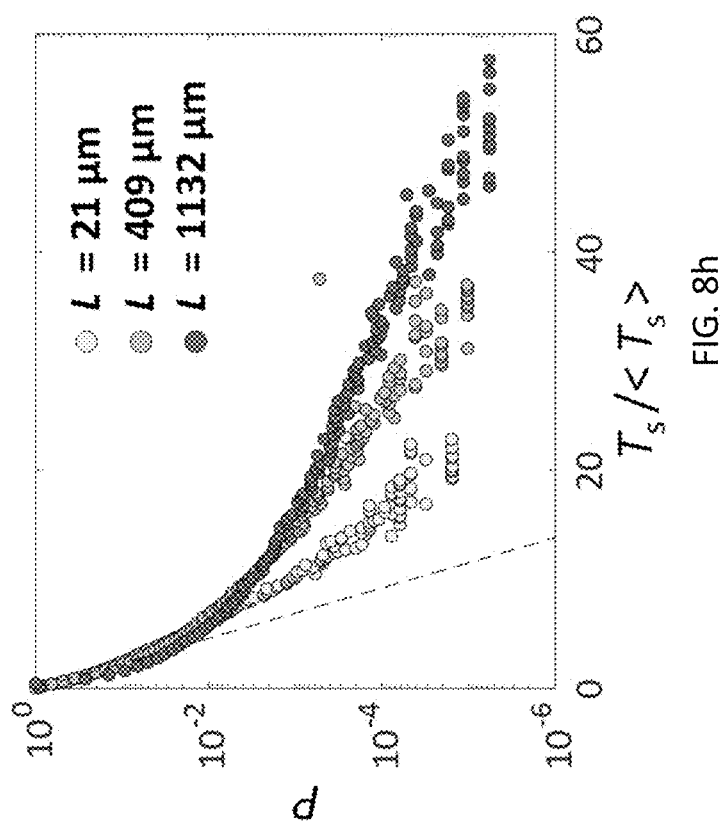
FIG. 8h provides corresponding probability distributions of $T_s/<T_s>$, corollary to FIG. 8d.

While the 21-μm akoya pearl shows a relatively homogeneous spatial distribution of intensity fluctuations, see FIG. 8a, the speckle patterns for L=409 and 1132 μm are described by a few bright and sharp transmission spots, see FIGS. 8b and 8c. In all cases, the probability distributions of the normalized transmission intensity p(T/<T>) significantly deviate from a Rayleigh distribution (negative exponential intensity statistics), as provided in FIG. 8d which is a graph of corresponding probability distributions of normalized transmission intensity T/<T>. As L increases, a small number of open channels (localized modes) survives while the overall transmission is suppressed. In the thick pearl (L=1132 μm), the localized mode is isolated in space, revealing a sharp and strong transmission peak in the imaging area. In all of the cases, p(T/<T>) significantly deviates from a Rayleigh distribution. The variances of normalized intensity var(T/<T>) are 2.4, 5.1 and 25.5 when L=21, 409 and 1132 μm, all of which exceed the critical value of 7/3 for the Anderson localization transition. The dimensionless conductance g estimated by fitting with a mesoscopic transport model also returns g=1.4 even for the 21-μm thick akoya pearl. Additionally, spectrally averaged speckle patterns are characterized through the same akoya pearls when a collimated (divergence angle θ=0.045° and transverse coherence length θ/λ=0.75 mm at λ=575 nm) white-light (λ=450-700 nm) beam is illuminated. Results are shown in FIGS. 8e-8g, which are corollary to FIGS. 8a-8c. Although the spectrally averaged transmission intensity $T_s(=\int_{450\,nm}^{700\,nm}T(\lambda)d\lambda)$ suppresses the intensity fluctuations, p($T_s$/<$T_s$>) still significantly deviates from a Rayleigh distribution, as shown in FIG. 8h, which provides corresponding probability distributions of $T_s$/<$T_s$>. The spatial speckle patterns T and $T_s$ become different from each other as L increases, indicating a reduced spectral correlation in a more localized medium. var($T_s$/<$T_s$>) is reduced such that var($T_s$/<$T_s$>)=var(T/<T>)/df, where df is the degree of freedom (or the number of independent variables). Compared with df=1.2 and 1.3 for L=21 and 409 μm, the thick akoya pearl with L=1132 μm results in df=3.6. This indicates that the more the light is localized, the less the transmission spectrum is correlated.

Spectral speckle patterns of light transmitted through pearls can be used for bases of compressive sampling. CS requires two constraints of sparsity and incoherence for satisfactory recovery with a small number of observations (or readings). In spectral compressive sampling, the relationship between an arbitrary input spectrum α and measured output intensity β through a set of m different bases (filters with different transmission spectra) in a discrete and fixed form (λ=$\lambda_1$, $\lambda_2$, ..., $\lambda_q$) can be expressed:

$$\beta=T\alpha \quad (3)$$

where $\alpha=[\alpha(\lambda_1),\alpha(\lambda_2),\ldots,\alpha(\lambda_q)]^T\in\mathbb{R}^q$,
$\beta=[\beta_1,\beta_2,\ldots,\beta_m]^T\in\mathbb{R}^m$, and
$T\in\mathbb{R}^{m\times q}$ is the measurement matrix of transmission spectra. Theoretically, if a set of filters with a narrow bandwidth (e.g. delta function) at all discretized λ are used, T is the identity matrix with m=q. If m<q, solving α can be considered an ill-posed problem. CS intends to solve this underdetermined problem such that α is represented by a certain orthonormal basis Ψ that transforms α into sparser signals s:

$$\beta=T\Psi s=\Phi s \quad (4)$$

Notably, the fidelity of CS recovery is determined by the properties of the sensing matrix Φ. In particular, the original signal can successfully be recovered from a fewer number of readings under more incoherent (or uncorrelated) condition in Φ (also known as the uncertainty principle in CS). However, designing Ψ that satisfies both sparsity and incoherence is not straightforward, in part because the choice of T is often limited by monotonous spectral responses of conventional manmade devices.

Figure 9A:
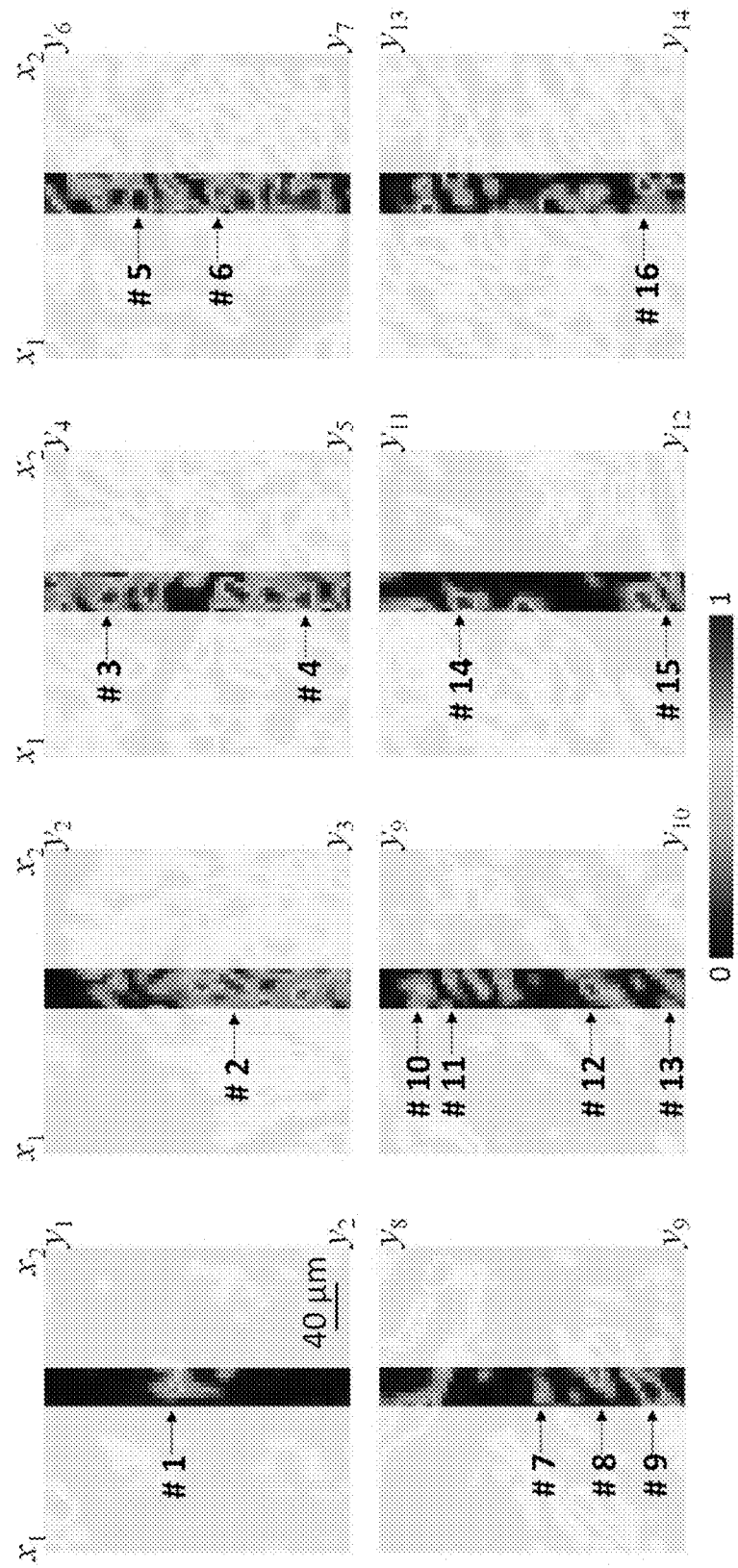
FIG. 9a provides the spatial speckle patterns of light transmitted through the 21-μm thick pearl, as alluded to in FIG. 10, which provides a large-area intensity map of spectrally averaged intensity transmitted through the 21-μm akoya pearl.
Figure 10:
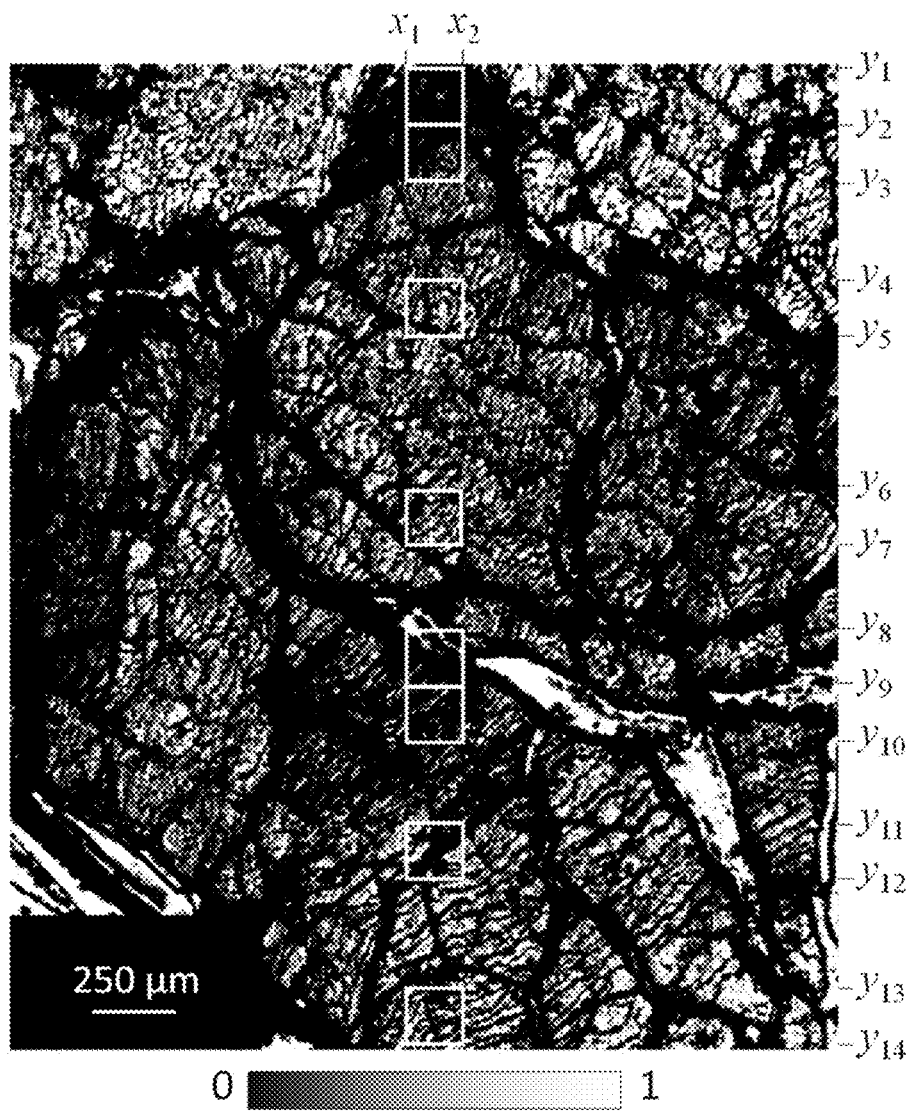
FIG. 10 provides a large-area intensity map of spectrally averaged intensity transmitted through the 21-μm akoya pearl.

Fortuitously, drastic frequency variations in transmission through a light localized medium can guarantee Φ to obey the uncertainty principle in CS theory. In other words, frequency fluctuations of light transmitted through a pearl provide a foundation of the high incoherent condition for Φ. FIG. 9a shows the spatial speckle patterns of light transmitted through the 21-μm thick pearl, as alluded to in FIG. 10, which provides a large-area intensity map of spectrally averaged intensity transmitted through the 21-μm akoya pearl. Hyperspectral line-scanning along the vertical direction at the center is acquired to measure the corresponding transmission spectra. The exact locations of the eight imaging areas for representative 16 spots shown in FIG. 8a are marked.

Figure 11A:
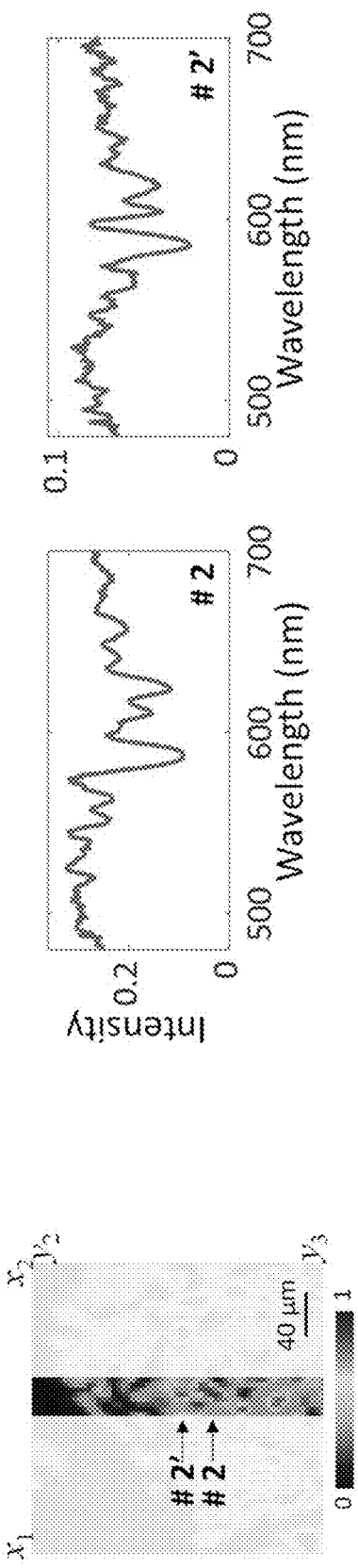
FIGS. 11a-11b provide possible coupled resonances of spatially adjacent peaks in akoya pearls; specifically, examples of transmission spectra of spatially adjacent peaks (left panels) measured through the 21-μm thick akoya pearl with the highly collimated white-light illumination are provided, where transmission spectra can have similar spectral profiles (right panels) due to coupled resonances, showing high correlation coefficients of 0.676 (FIG. 11a) and 0.552 (FIG. 11b).
Figure 11B:
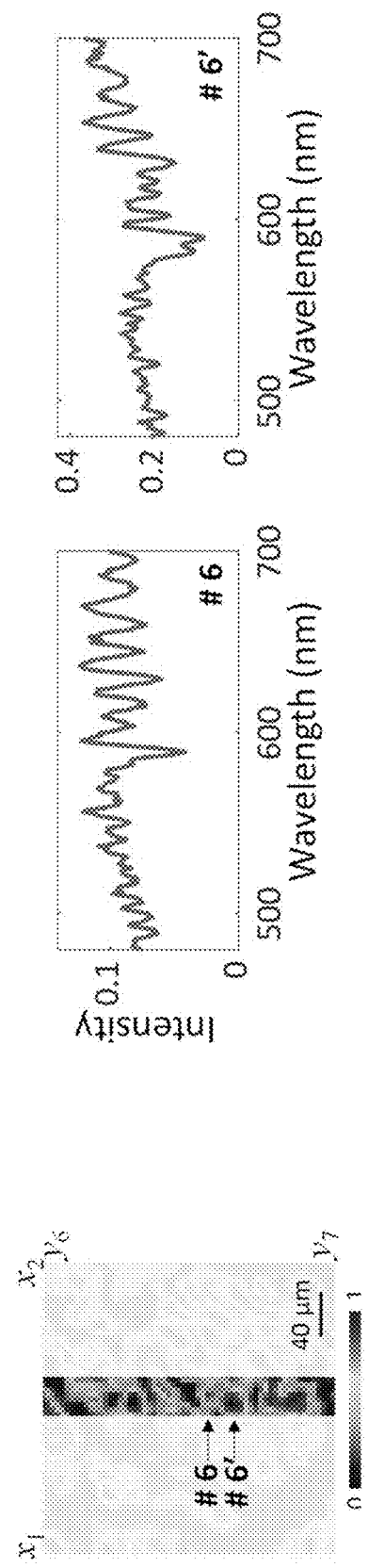

We intentionally make use of the 21-μm thick pearl, because the overall transmission intensity values are relatively high and the polarization state is highly maintained. It should be noted that the 21-μm thick pearl is still in the Anderson regime as shown in FIGS. 8a and 8d (FIG. 8d provides corresponding probability distributions of normalized transmission intensity T/<T>. As L increases, a small number of open channels (localized modes) survives while the overall transmission is suppressed. In the thick pearl (L=1132 μm), the localized mode is isolated in space, revealing a sharp and strong transmission peak in the imaging area. In all of the cases, p(T/<T>) significantly deviates from a Rayleigh distribution). From hyperspectral line-scanning with an imaging spectrograph (Supporting Information), the corresponding transmission spectra along the vertical central line are acquired simultaneously. To compose a set of bases for T, we select 16 bright spots of the spectrally averaged transmission intensity map, which are separated in space. To ensure distinctively unique transmission spectra, we avoid adjacent transmission spots occasionally coupled to each other, which can be checked by spectral similarity with high correlation coefficients (>0.5) in the frequency domain as shown in FIGS. 11a and 11b which provide possible coupled resonances of spatially adjacent peaks in akoya pearls. Specifically, examples of transmission spectra of spatially adjacent peaks (left panels) measured through the 21-µm thick akoya pearl with the highly collimated white-light illumination are provided. Occasionally, transmission spectra can have similar spectral profiles (right panels) due to coupled resonances, showing high correlation coefficients of 0.676 (FIG. 11a) and 0.552 (FIG. 11b). Because uncorrelated transmission spectra provide incoherent bases of compressive sampling, coupled resonances spatially closed to each other are avoided.

Figure 9B:
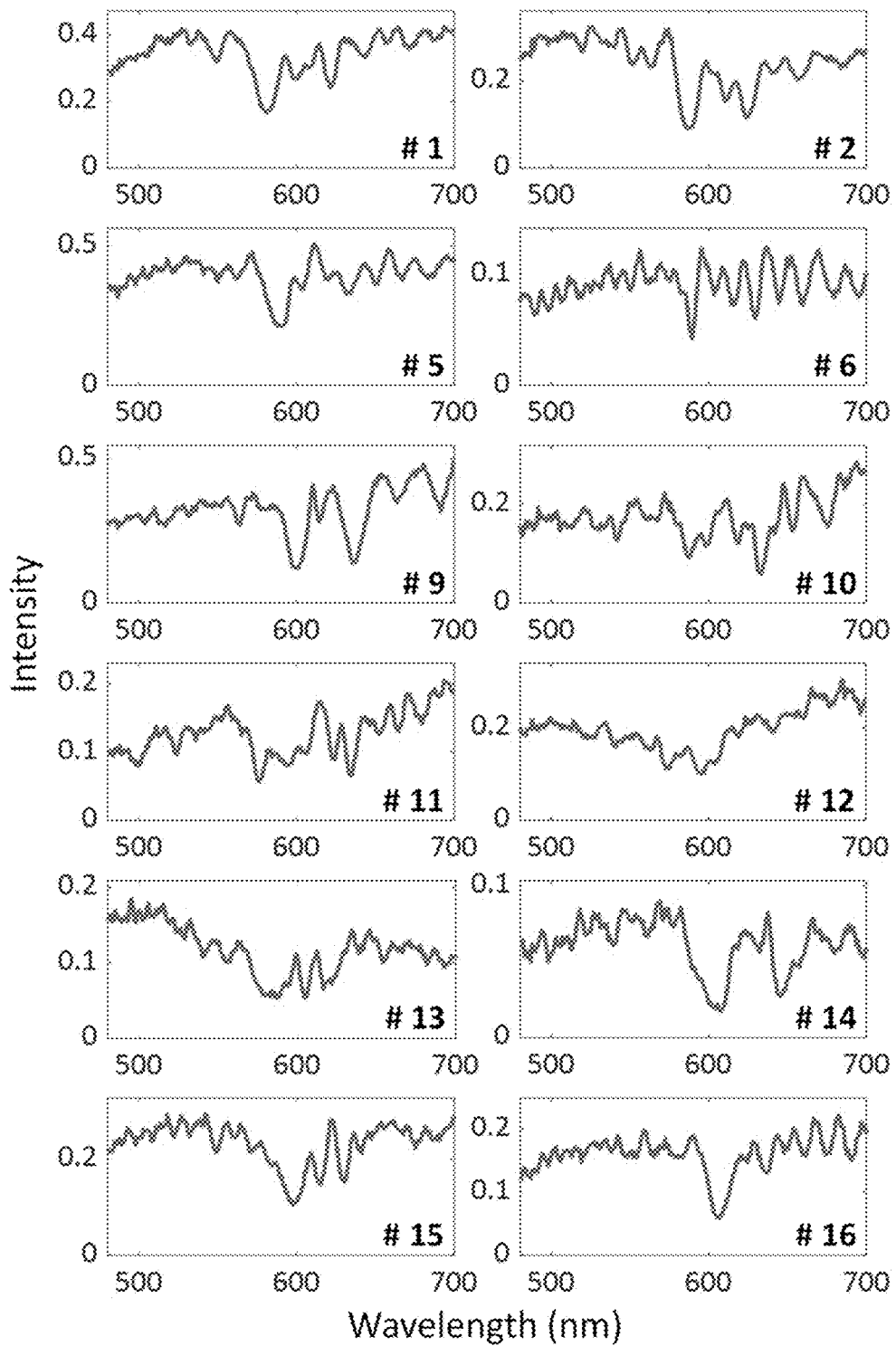
Figure 9C:
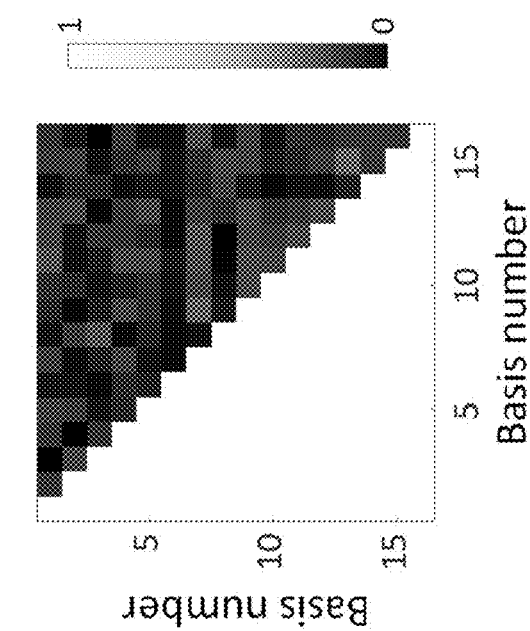
FIG. 9c provides a pairwise comparison map of cross-spectral analyses further shows that all of 16 different transmission spectra are highly uncorrelated with an average correlation coefficient of 0.161; the off-diagonal points represent the correlation coefficients compared with transmission spectra at other locations.
Figure 9B:
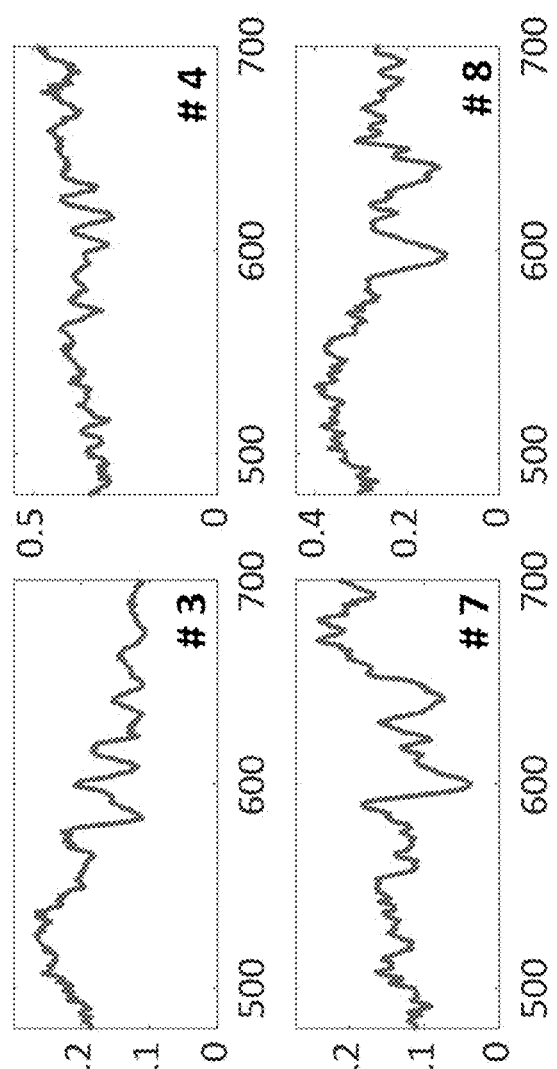
Figure 12:
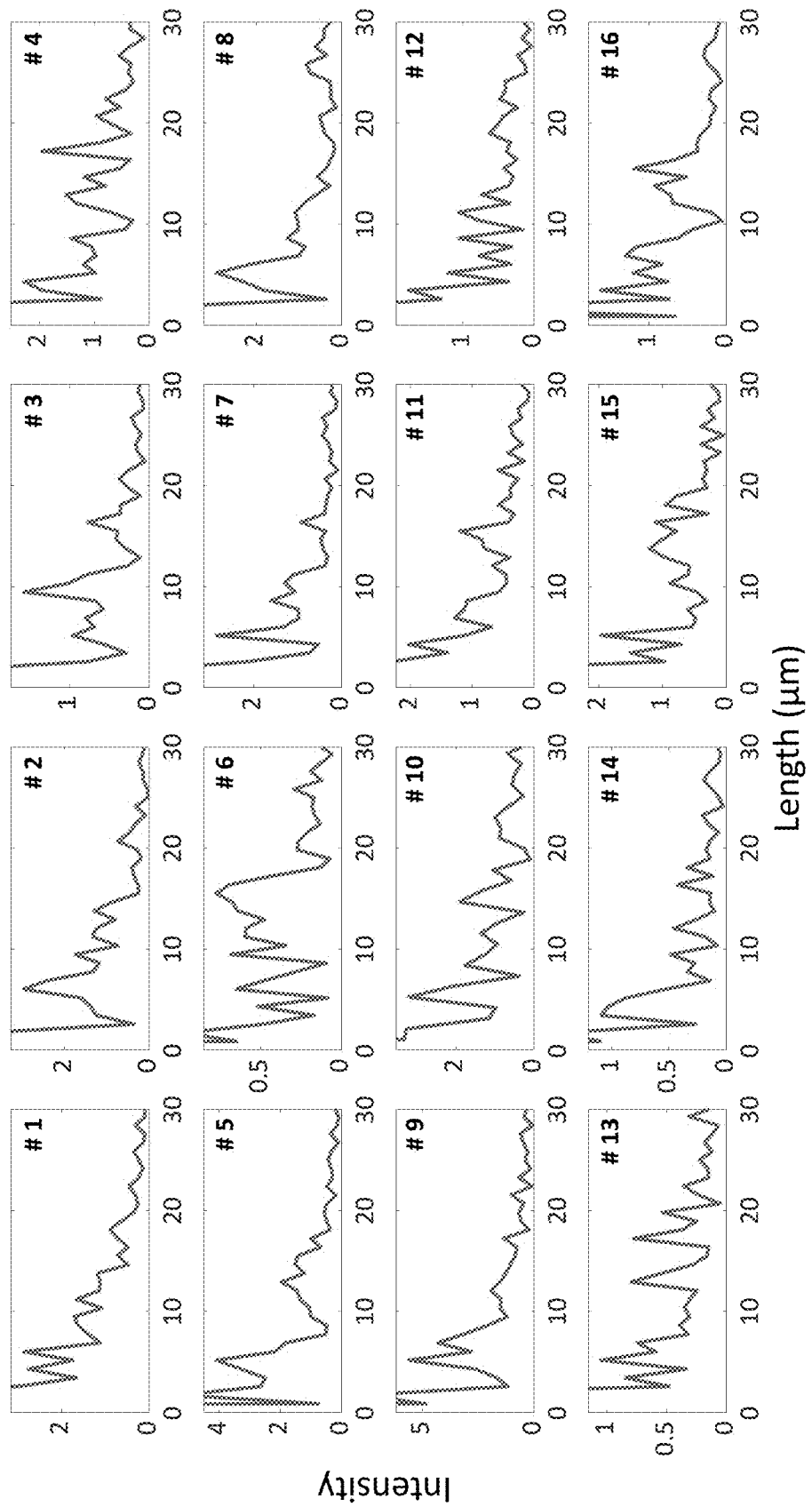
FIG. 12 provide Fourier transforms of measured transmission spectra of akoya pearls.
Figure 13B:
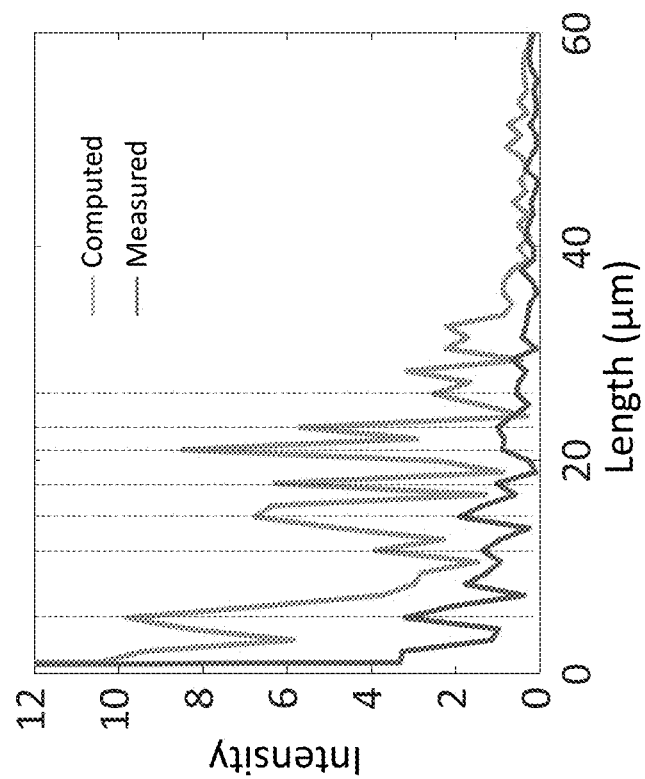
Figure 13A:
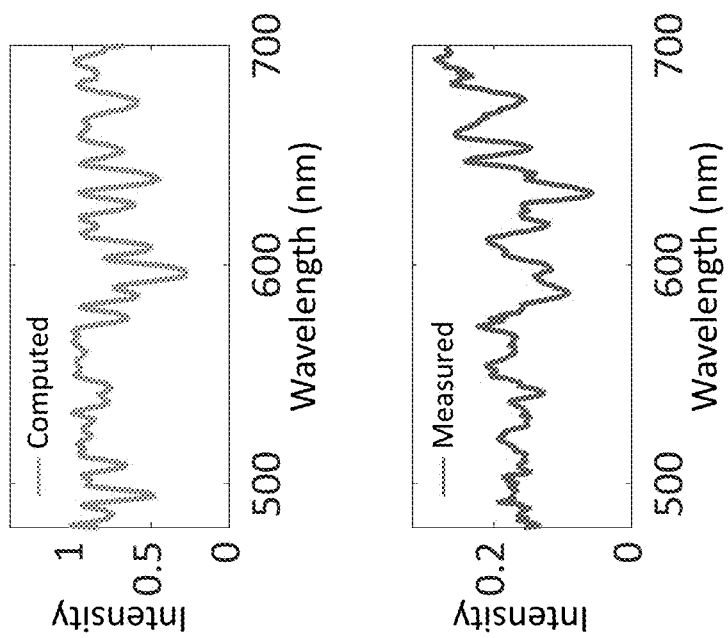
Figure 14:
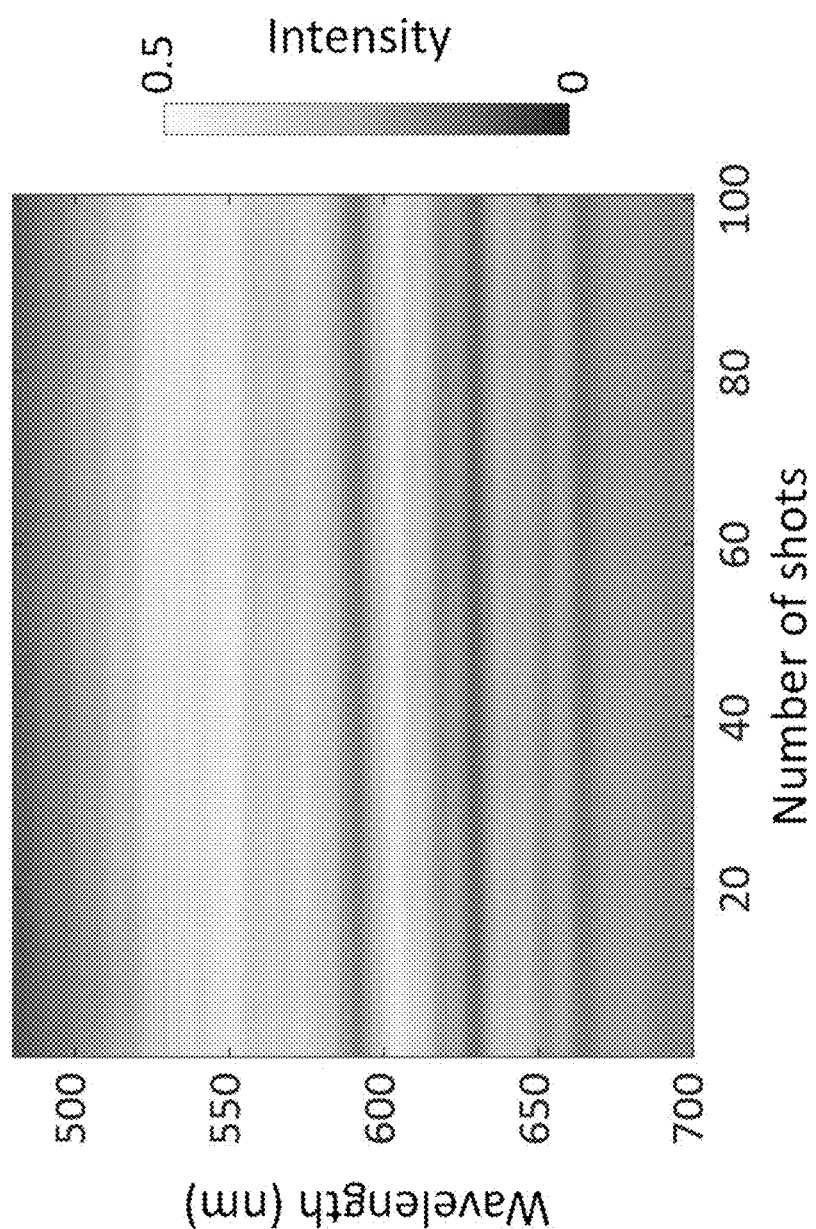
FIG. 14 provides temporal stability of transmission spectra through akoya pearls; specifically, FIG. 14 provides representative transmission spectra measured through the 21-μm thick akoya pearl in a fixed location.

Referring to FIG. 9b, corresponding measured transmission spectra of the selected spots in the spectrally averaged transmission map of FIG. 9a are provided. The spectral profile of each transmission spectrum is distinct with a unique random pattern. Each transmission spectrum does not have a well-defined spectral profile and appears to be a noise-like random spectrum. Obviously, given that L (=21 µm) is comparable to $\xi$ (=18.5 µm), discrete and high-quality-factor peaks in frequency, formed in a deeply localized sample, are not apparent as shown in FIG. 6b. The transmission spectra are averaged over the spectrograph slit width (30 µm) (Supporting Information). Nonetheless, the transmission spectra have diverse spectral features including fine and coarse fluctuations that can be captured by various scales through the Fourier transformation as provided in FIG. 12, including 16 panels, which provide Fourier transforms of measured transmission spectra of akoya pearls. Specifically, The Fourier transforms of transmission spectra (shown in FIG. 9b) reveal manifestations of diverse and random spectral features in the longitudinal spatial. The various length scales in each case support that the corresponding transmission spectrum has diverse spectral features including fine and coarse fluctuations in the frequency domain. The overall shape of the measured transmission spectra is in good agreement with simulated transmission spectra, incorporating the optical and morphological properties of akoya nacre and the spectral resolution (=2.1 nm) of the imaging spectrograph as provided in FIGS. 13a and 13b, which provide comparisons between simulated and measured transmission spectra. Specifically, FIG. 13a provides representative computed transmission spectrum, incorporating the optical and morphological properties of akoya nacre (pearl's internal substance) and the spectral resolution of the imaging spectrograph. The computed spectrum is convoluted by the spectral response function of the spectrograph. The representative transmission spectrum is measured from the corresponding akoya pearl sample. FIG. 13b provides Fourier transforms of the transmission spectra shown in FIG. 13a. The spatial frequency distributions show various length scales corresponding to the frequency fluctuations in the broad range of 450-700 nm. The transmission spectra are also highly stable over time to preserve spectral information as provided in FIG. 14 which provides temporal stability of transmission spectra through akoya pearls. Specifically, FIG. 14 provides representative transmission spectra measured through the 21-µm thick akoya pearl in a fixed location. The series of single-shot spectra are identical for an extended period of time of 2,000 seconds. Importantly, the 21-µm thick pearl still allows us to have a practical sensing matrix $\Phi$ for experimental CS measurements and successful recovery with a decent spectral resolution in the broad visible range. In FIG. 9c, the pairwise comparison map of cross-spectral analyses further shows that all of 16 different transmission spectra are highly uncorrelated with an average correlation coefficient of 0.161; the off-diagonal points represent the correlation coefficients compared with transmission spectra at other locations. This is attributable to the fact that strong light localization results in a spatially and spectrally incoherent sensing matrix, which can be used to effectively recover hyperspectral information. The spectral manifestations of light localization are diverse, unpredictable, and random, offering an unlimited set of incoherent bases for compressive sampling in frequency.

In the underdetermined linear system according to Eq. 3, once sparsity and compressibility are enforced as expressed in Eq. 4, $l_1$-minimization is the most common method to solve the ill-posed inverse problem. In this case, the majority of unnecessary components (weights) is forced to be zeros, yielding only few non-zero components and avoiding overfitting. Although $l_0$-norm can provide a simple notion of sparsity, an $l_0$-minimization problem is computationally impossible to solve (also known to be NP-hard), because it is non-convex. It can be treated to the corresponding $l_1$-minimization problem. In other words, $l_1$-minimization is completely different from $l_2$-minimization in which all of the data points are used to minimize the sum of squared residuals. Thus, we recover the original signal by using $l_1$-minimization that finds a minimum $l_1$-norm solution of the underdetermined linear system of $\beta = T\Psi s = \Phi s$ (Eq. 4): minimize $\|s\|_1$ $$\text{subject to } \|\beta - \Phi s\|_2 \le \varepsilon \tag{5}$$

where a linear combination of Gaussian functions is used for $\Psi$ to enhance sparsity, $\varepsilon$ is a noise level in the measurement intensity, and the $l_p$-norm for $x \in \mathbb{R}^n$ is defined as $\|x\|_p \triangleq (\Sigma_{i=1}^n |x_i|^p)^{1/p}$. For practicality, we solve Eq. 5 as an unconstrained basis pursuit denoising problem by employing a weighted value $\gamma$:

$$\text{minimize } \tfrac{1}{2} \|\beta - \Phi s\|_2^2 + \gamma \|s\|_1 \tag{6}$$

which is also known as Lasso regularization or Lasso regression. Several $l_1$-norm solvers with sparsity algorithms are commonly available. In particular, based on a convex optimization algorithm, CVX provides excellent MATLAB-based open sources with computationally efficient calculations of $l_1$-norm optimization problems.

Various nanofabrication techniques can be employed including atomic layer deposition, chemical vapor deposition, physical vapor deposition, sputtering, spin-coating, electroplating, and E-beam process to deposit layers in a randomized manner both in terms of thickness of each layer, material in each layer, and variation of thickness or refractive index in each layer.

In addition to the nanofabrication methods described above, if a double-layered film is folded or stacked x times, the total number of layers L can be realized such that $L=2^{(x+1)}$. This folding approach is another way to fabricate the disordered multilayered nano-structure with a large number of layers.

In addition to the randomness of the structure, additional reconfigurability or variability in the transmission spectrum of pearl-inspired hyperspectral filter arrays is achieved by applying an external signal. An internal structural change in the pearl-like hyperspectral filter array can be obtained by an external signal (e.g. external electric field or magnetic field). Such a subtle perturbation in the pearl-like hyperspectral filter array can induce a dramatic change in multiple localized modes (i.e. change in the transmission spectrum). In other words, the tunability of spectral resolution can be achieved by the variability of the filter array. Additional measurements through uncorrelated spectral bases allow us to result in a higher spectral resolution during hyperspectral reconstruction, because the variability of the filter arrays generates highly uncorrelated spectral responses. The number of measurements through different transmission patterns will determine the spectral resolution of reconstructed spectrum, because each transmission spectrum is different and unique The material of the novel hyperspectral filter arrays of the present disclosure may include a variety of materials that are transparent with a robust refractive index contrast in the wavelength range of interest to minimize losses from light absorption through a multiply scattered long pathlength. In particular, several materials are available for infrared (IR) wavelength ranges which include material selected from the group consisting of low density polyethylene (LDPE), high density polyethylene (HDPE), N-BK7, silica glass ($SiO_2$), Crystal Quartz, $CaF_2$, ZnSe, polysulfide (Sulfur polymer), polymethyl methacrylate (PMMA), benzocyclobutene (BCB) polymer, and SU-8.

Figure 15A:
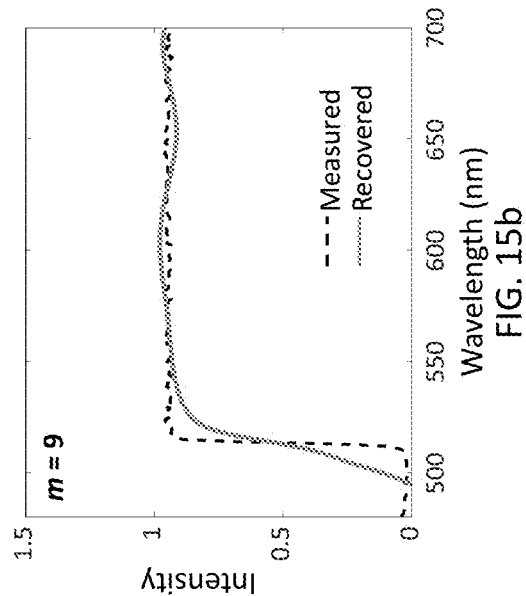
FIGS. 15a-15d provide tunability of spectral resolution with a different number of incoherent bases, specifically, the line spread function (LSF) is derived from the edge spread function (ESF) acquired by a longpass edge filter (with a sharp cut-on at 515 nm) with the number of bases m=4 (FIG. 15a), 9 (FIG. 15b), and 16 (FIG. 15c), respectively, and FIG. 15d provides recovered spectral resolution as a function of m.
Figure 15B:
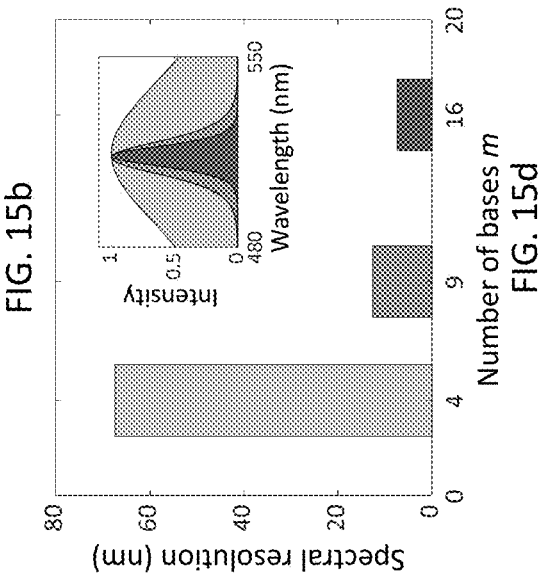
Figure 15C:
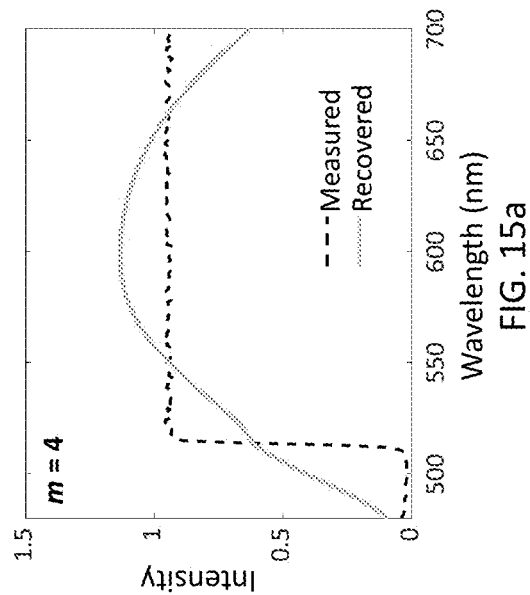
Figure 15D:
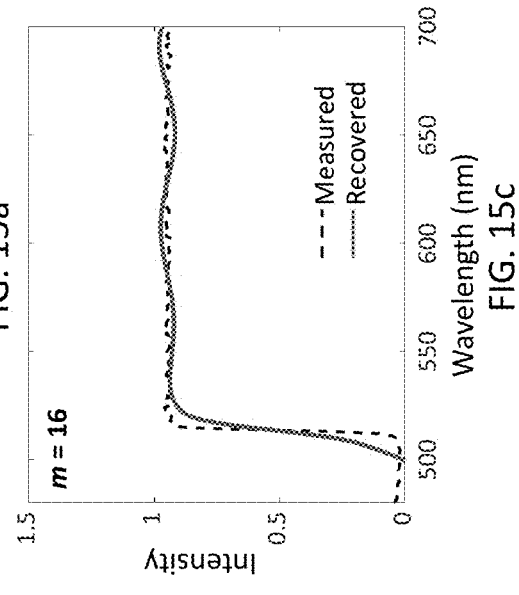
Figure 16B:
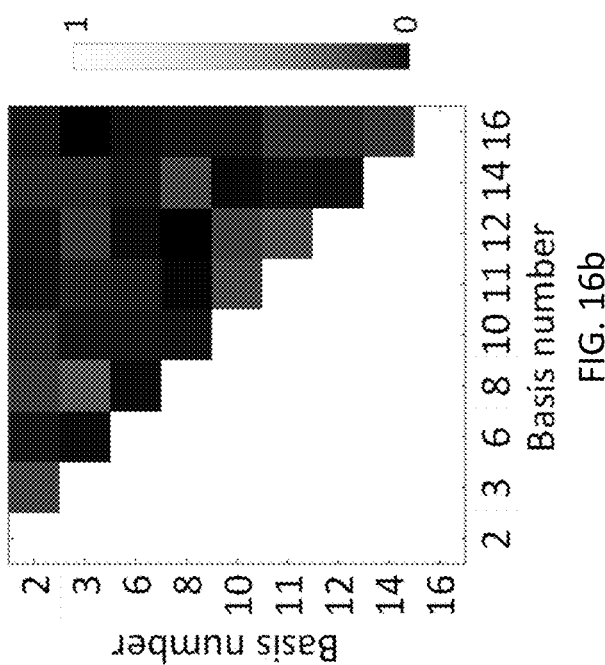
FIGS. 16a-16b provide pairwise correlation coefficients of compressive sensing bases; specifically.
Figure 16A:
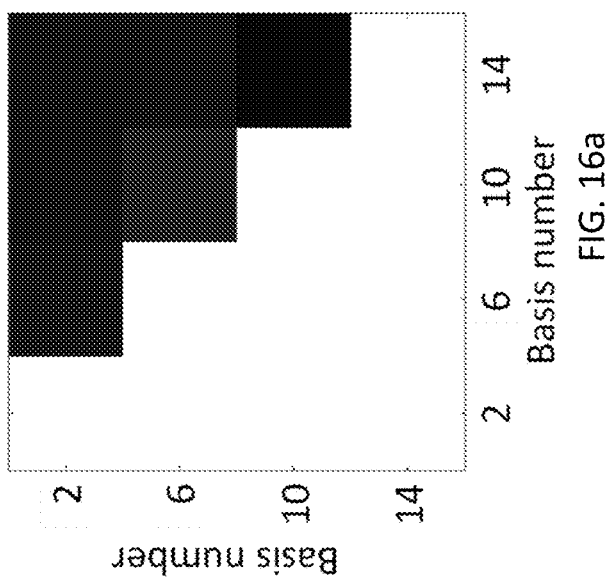

Through experimentation, we examined the tunability of recovered spectral resolution as a function of the number of bases m, which is the number of actual readings. We determined the recovered spectral resolution using a longpass edge filter with a sharp cut-on slope at 515 nm ad provided in FIGS. 15a-15d, which provide tunability of spectral resolution with a different number of incoherent bases. Specifically, according to FIGS. 15a-15c the line spread function (LSF) is derived from the edge spread function (ESF) acquired by a longpass edge filter (with a sharp cut-on at 515 nm) with the number of bases m=4 (FIG. 15a), 9 (FIG. 15b), and 16 (FIG. 15c), respectively. Referring to FIG. 15d, recovered spectral resolution as a function of m is provided. The use of more incoherent bases m from randomly selected transmission spots results in a better spectral resolution after hyperspectral recovery. Only 16 readings return a recovered spectral resolution as low as 7.4 nm. Inset: LSF derived from ESF in the frequency domain, which is also known as the knife-edge method. The derivative of this edge spread function (ESF) with respect to $\lambda$ returns a line spread function (LSF): $LSF(\lambda)=|dESF(\lambda)/d\lambda|$. The spectral resolution is then calculated by a full width at half maximum (FWHM) of LSF. In this case, the original spectral signal of ESF essentially represents non-zero elements, which are typically challenging for conventional compressive sensing to recover. Thus, this spectral resolution analysis with ESF in the frequency domain also supports the robustness of spectral recovery. We compute the recovered spectral resolution for m=4, 9, and 16 as provided by FIGS. 16a and 16b which provide Pairwise correlation coefficients of compressive sensing bases. Specifically, FIG. 16a depicts four bases that are used in FIG. 9b (#2, #6, #10, and #14). An averaged correlation coefficient among the four bases is 0.104. FIG. 16b depicts nine bases that are used in FIG. 9b (#2, #3, #6, #8, #10, #11, #12, #14, and #16). An averaged correlation coefficient among the nine bases is 0.126. As expected, a larger number of readings results in a narrower spectral resolution (as shown in FIG. 15d). While the spectral recovery with m=4 returns a spectral resolution of 67.5 nm, the cases of m=9 and 16 enable decent spectral resolutions of 12.6 and 7.4 nm, respectively. Overall, an unlimited set of incoherent spectral bases, which can be randomly selected in different locations of a light localized medium, provides a foundation for the spectral resolution tunability by simply varying the number of readings (=m). If prior information on spectral features of a target or object of interest is available, a desired spectral resolution can be achieved by selecting an appropriate number of incoherent bases m.

Figure 17C:
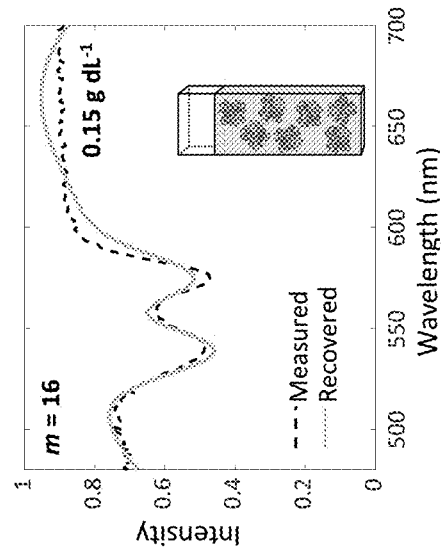
FIGS. 17c-17f provide blood hemoglobin solutions at different concentrations: 0.15 g dL-1 (FIG. 17c), 0.21 g dL-1 (FIG. 17d), 0.27 g dL-1 (FIG. 17e), and 0.38 g dL-1 (FIG. 17f).
Figure 17D:
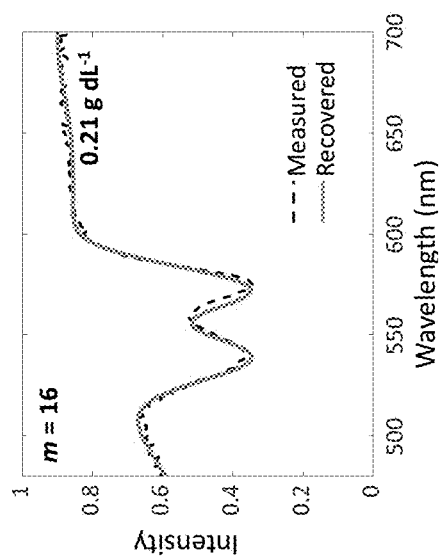
Figure 17A:
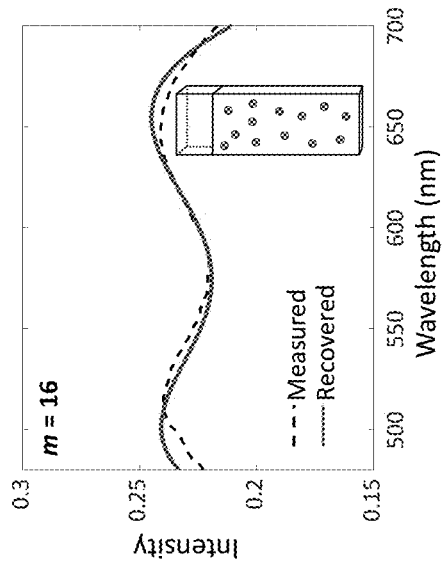
FIG. 17a provides high fidelity of recovered transmission spectra of two different types of testing samples.
Figure 17B:
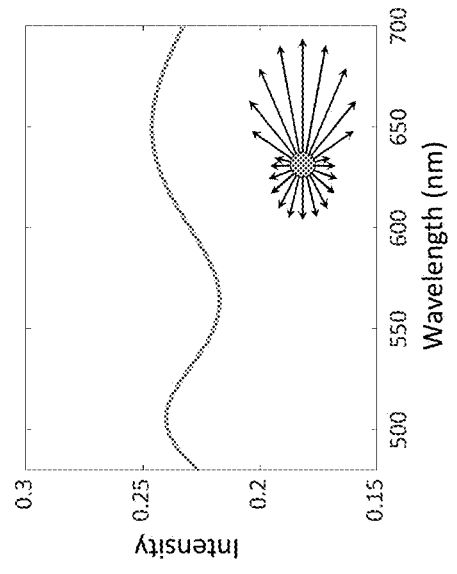
FIG. 17b provides computed spectrum using an inverse calculation of Mie theory to estimate the size.
Figure 17E:
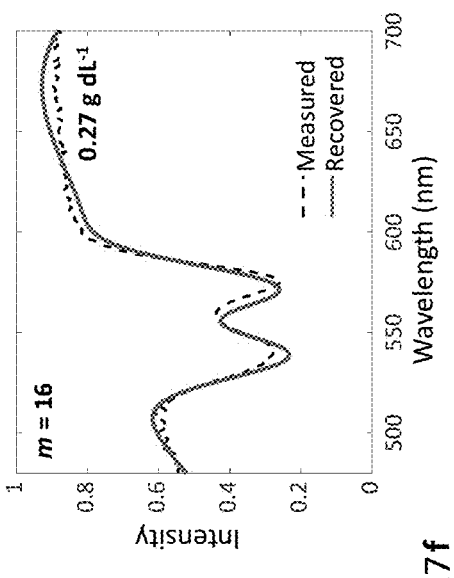
Figure 17F:
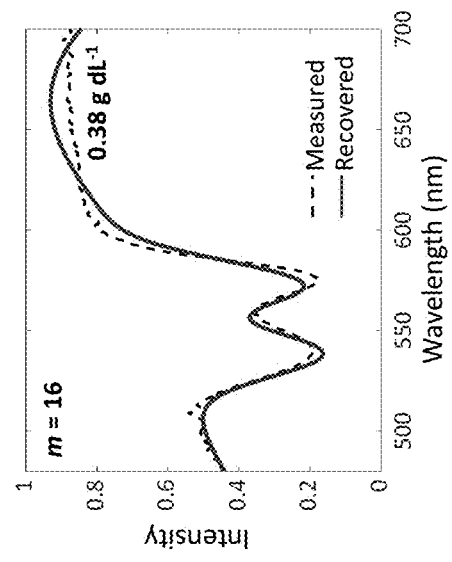

Using two different types of light scattering and absorption testing samples, we further evaluated the performance of CS recovery using 16 bases from the thin pearl (L=21 µm) in a similar manner of multispectral filter array, which can easily be combined with a commercially available sensor. The first testing sample is a Mie-scattering dominant suspension consisting of polystyrene microparticles with a nominal diameter of 9±0.2 (SD) µm. The retrieved oscillatory spectral pattern from the Mie-dominant scattering sample is in good agreement with the measured spectrum as shown in FIG. 17a, which provides high fidelity of recovered transmission spectra of two different types of testing samples. An inverse calculation of the recovered spectrum using Mie theory also returns a reliable size estimation with a diameter of 8.9±0.3 (SD) µm (FIG. 5b). The second testing sample is light absorption solutions with blood hemoglobin, which is one of the abundant biomolecules. The recovered transmission spectra of hemoglobin solutions at different concentrations (0.15-0.38 g $dL^{-1}$) are matched well with the measured spectra that have very unique absorption signatures in the visible range. See FIGS. 17b-17f. Specifically, FIG. 17b provides computed spectrum using an inverse calculation of Mie theory to estimate the size, which agrees well with the labeled size. FIGS. 17c-17f provide blood hemoglobin solutions at different concentrations: 0.15 g dL-1 (FIG. 17c), 0.21 g dL-1 (FIG. 17d), 0.27 g dL-1 (FIG. 17e), and 0.38 g dL-1 (FIG. 17f). The recovered transmission spectra (solid lines) with 16 readings reliably capture the distinct spectral signatures of hemoglobin, which are also in excellent agreement with the measured spectra (dotted black lines) in the broad spectral range of $\lambda$=450-700 nm. In other words, only 16 readings enable the reliable recovery of the original spectra in the broad spectral range of $\lambda$=450-700 nm. Considering a large size of typical hyperspectral image data, another potential application of light localization-based spectral information processing is spectral data compression; if compressive sampling and recovery are used as an encoder and a decoder, the salient spectral information can be retained using significantly less storage (m=16; 128 bytes with double precision) than Nyquist (1-nm sampling for a spectral resolution of 2.1 nm) sampled data (q=250; 2000 bytes with double precision) with an average root mean square error of $1.0\times10^{-3}$ in the blood hemoglobin testing samples.

Figure 18:
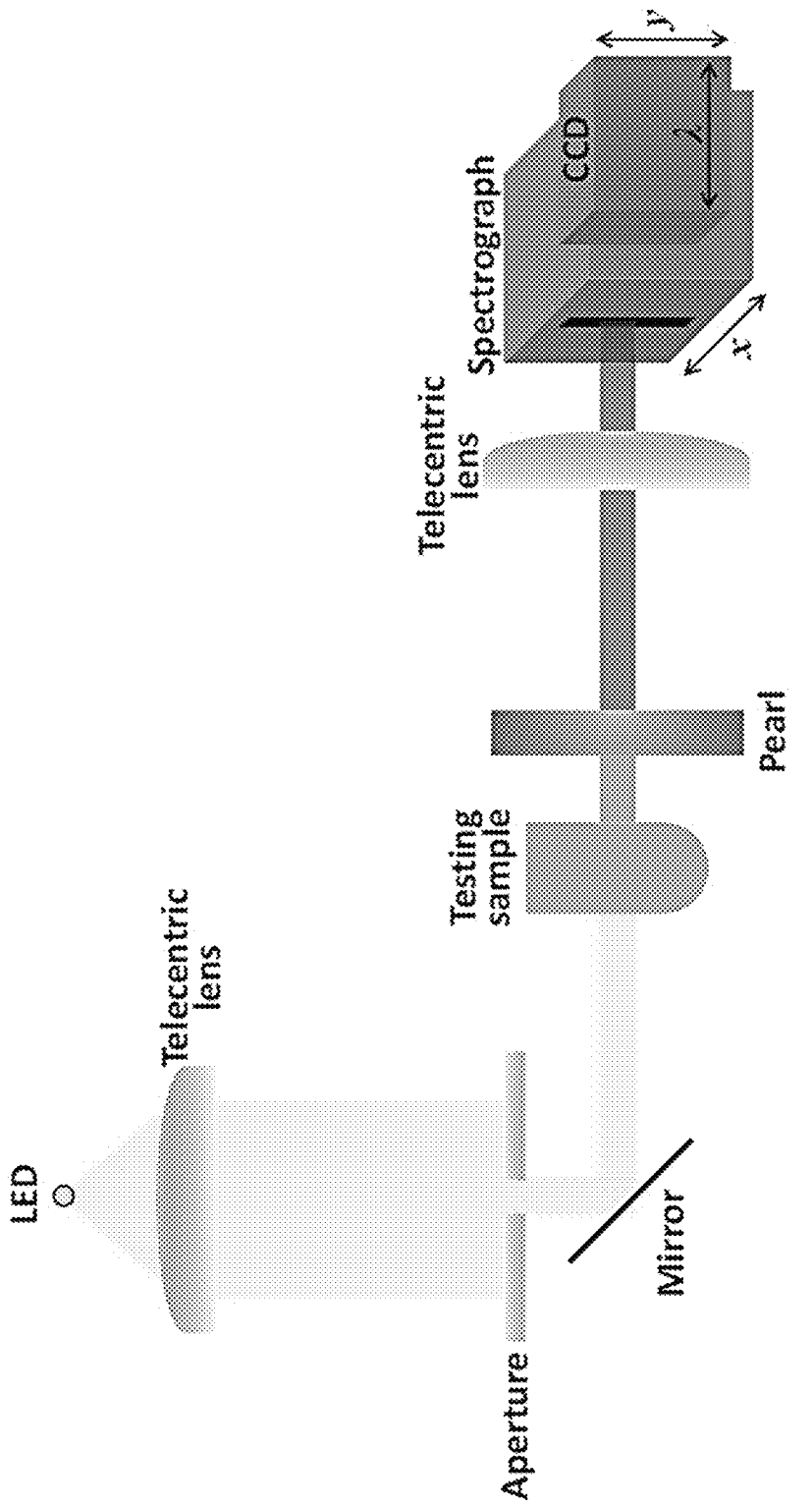
FIG. 18 is a schematic depicting the experimental setup, according to the present disclosure.

Referring to FIG. 18, a schematic is shown depicting the experimental setup. The white-light LED is collimated through a telecentric lens with a divergence angle of 0.045°. The incident beam travels through the testing sample and an akoya pearl. The transmitted light is then imaged through a telecentric lens (4×) with an acceptance angle of 2.15°. The testing sample is contained in a 5-mm thick quartz cuvette. The 21-µm thick akoya pearl is used for practical compressive sampling with relatively high transmission intensity, which allows us to have reliable spectral recovery with a decent spectral resolution in the broad visible range.

It should be appreciated that the optical layers forming the Anderson localized hyperspectral filter array of the present disclosure are selected from material that each have a different refractive index and wherein no consecutively deposited optical layers have the same refractive index, and furthermore thickness of each deposited layer is randomly selected about a predetermined mean thickness (e.g., between about ¼ to about 1× of a mean wavelength of a spectral range of interest) and bounded by a predetermined upper bound and a predetermined lower bound. These optical layers are either deposited on a transparent layer, or a sacrificial substrate that is later removed, or are deposited on an optical layer formed structurally similar to one of the optical layers deposited but placed as an initial thin film layer. In any of these cases, the first layer (i.e., a sacrificial layer or otherwise), is selected from the group consisting of low density polyethylene (LDPE), high density polyethylene (HDPE), N-BK7, silica glass ($SiO_2$), Crystal Quartz, CaF2, ZnSe, polysulfide (Sulfur polymer), polymethyl methacrylate (PMMA), benzocyclobutene (BCB) polymer, SU-8, and a combination thereof. These layers are deposited, each having a randomized thickness, until the overall thickness of the optical filter is greater than the Anderson localized length of light.

Figure 19:
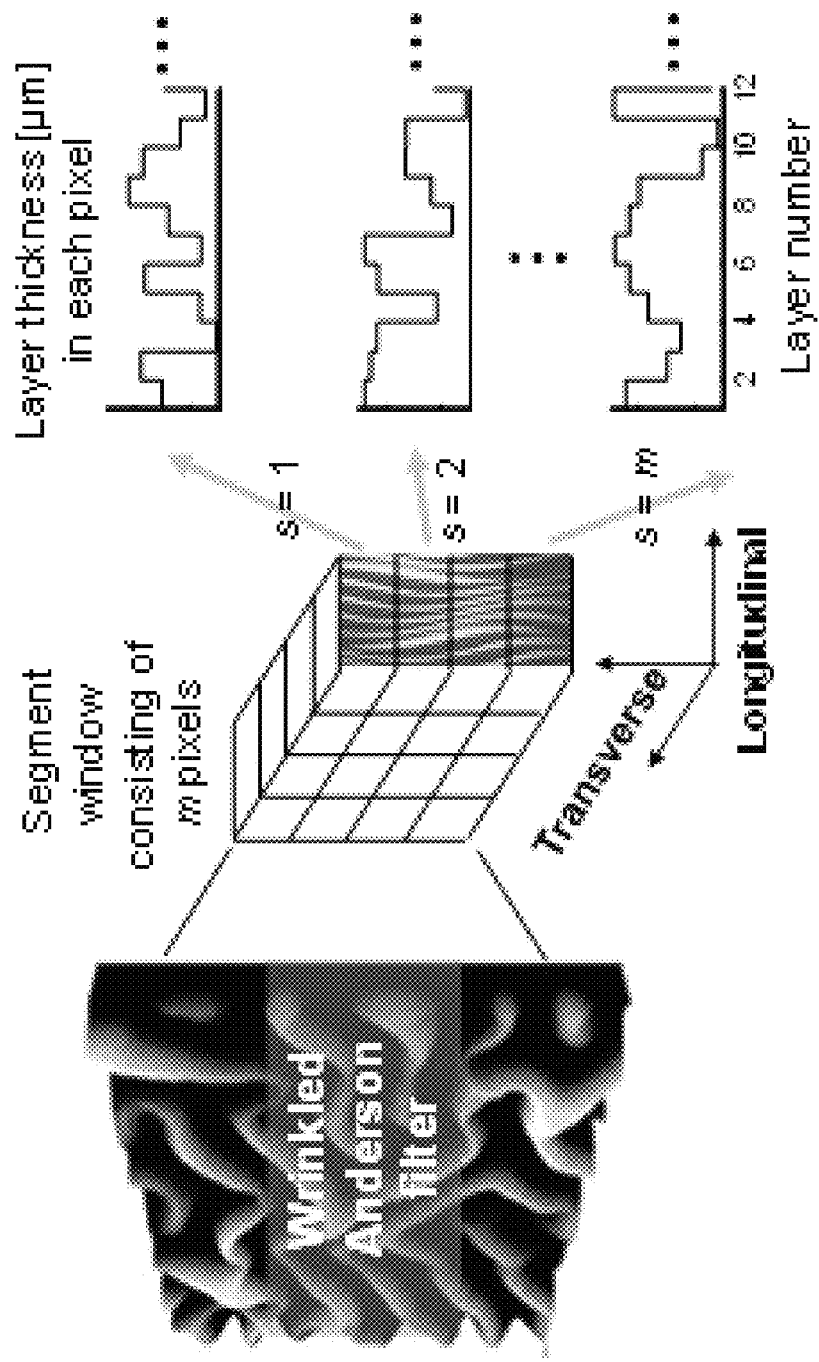
FIG. 19 is a schematic of converting pixels in an optical filter as discussed herein into super-pixels by causing plastic deformation of the filter.

The optical filter can be divided into a plurality of pixels (see FIG. 19, discussed below). Each array of pixels, prior to use can be calibrated and the filter provided with a schedule of calibration for the array.

In addition to the disclosure provided above, the present disclosure provides another aspect of randomness of the optical filter utilizing a randomized wrinkled surface. This aspect is shown in FIG. 19, which is a schematic of converting pixels in an optical filter as discussed herein into super-pixels by causing plastic deformation of the filter. As shown in FIG. 19, the optical filter generated based on deposition of the optical layers at randomized thicknesses, is subjected to forces in one or more directions each at one surface while keeping opposite surfaces stationary. The wrinkled filter can be divided into a plurality of pixels, as shown in FIG. 19. The applied forces result in plastic deformation of the optical filter, which owing to its construction results in a randomized wrinkled surface, and further owing to its randomized thicknesses of each layer making up the array resulting in each pixel having a different refractive index by way of a randomized density. Each pixel is termed herein as a super-pixel given its characteristics of 1) randomized thicknesses, 2) randomized surfaces, and randomized refractive indices. The plastic deformation is continued until transmission spectra from different locations of the deformed hyperspectral filter array are substantially uncorrelated such that a pairwise comparison of transmission spectra has an average correlation coefficient less than 0.2. In order to properly utilize these super-pixels, each pixel is calibrated prior to use with a calibration schedule provided with each filter. It should be appreciated that if the initial thickness of each deposited optical layer is not selected randomly (i.e., all the deposited layers having substantially a uniform thickness), the above-described application of force and the associated plastic deformation would still result in a randomized refractive index for each pixel, albeit to a lesser degree.

Those having ordinary skill in the art will recognize that numerous modifications can be made to the specific implementations described above. The implementations should not be limited to the particular limitations described. Other implementations may be possible.

The invention claimed is:

1. An Anderson localized hyperspectral filter array, comprising:
a base layer; and
a plurality of optical layers deposited on the base layer selected from two or more materials, each material having a refractive index that is different from the other materials of the two or more materials, wherein no consecutively deposited optical layers have the same refractive index, each of the plurality of optical layers having a thickness chosen based on a random number within a predetermined range,
wherein an optical non-uniformity in one direction is introduced by a manufacturing method for each pixel, defined as a unit area on the hyperspectral filter array,
wherein the hyperspectral array is divided into a plurality of pixels and the optical non-uniformity is permanently formed in the hyperspectral filter array as plastic deformation resulting in a random formation for each pixel thus resulting in a different spectral response due to a different layered structure for each pixel,
wherein transmission spectra from each pixel having the different layered structure, and wherein a pairwise comparison of transmission spectra of any two pixels has an average correlation coefficient less than 0.2.

2. The Anderson localized hyperspectral filter array of claim 1, wherein materials of the plurality of optical layers are selected from substantially transparent materials of a wavelength range of interest.

3. The Anderson localized hyperspectral filter array of claim 2, where in case of visible and infrared wavelength ranges, the relatively transparent materials is selected from the group consisting of low density polyethylene (LDPE), high density polyethylene (HDPE), N-BK7, silica glass (SiO2), Crystal Quartz, CaF2, ZnSe, polysulfide (Sulfur polymer), polymethyl methacrylate (PMMA), benzocyclobutene (BCB) polymer, SU-8, and a combination thereof.

4. The Anderson localized hyperspectral filter array of claim 3, wherein the randomness of thickness of each layer is determined by selecting a random number about a predetermined mean thickness and bounded by a predetermined lower boundary and a predetermined upper boundary.

5. The Anderson localized hyperspectral filter array of claim 4, wherein the predetermined mean thickness is between about ¼ to about 1× of a mean wavelength of a spectral range of interest.

6. The Anderson localized hyperspectral filter array of claim 1, wherein the overall physical thickness in a longitudinal direction is greater than the localization length of light in the hyperspectral filter array.

7. The Anderson localized hyperspectral filter array of claim 1, wherein the plurality of optical layers is deposited on the base layer using a manufacturing method selected from the group consisting of atomic layer deposition, chemical vapor deposition, physical vapor deposition, sputtering, spin-coating, electroplating, and E-beam process.

8. The Anderson localized hyperspectral filter array of claim 1, wherein the base layer is a sacrificial layer and is removed to yield an optical filter comprised of only the plurality of optical layers.

9. The Anderson localized hyperspectral filter array of claim 1, wherein the base layer is one layer from the plurality of optical layers.

10. The Anderson localized hyperspectral filter array of claim 1, wherein the hyperspectral filter array is divided into a plurality of pixels, each pixel defined as a unit area of the hyperspectral filter array.

11. The Anderson localized hyperspectral filter array of claim 10, wherein spectral response for each pixel of the plurality of pixels is characterized and provided with the hyperspectral filter array.

12. An Anderson localized hyperspectral filter array, comprising:
a base layer; and
a plurality of optical layers deposited on the base layer randomly selected from a plurality of materials, each material having a refractive index that is different from the other materials of the plurality of materials, wherein no consecutively deposited optical layers have the same refractive index, each of the plurality of optical layers having a thickness chosen based on a random number within a predetermined range, wherein an optical non-uniformity in one direction is introduced by a manufacturing method for each pixel, defined as a unit area on the hyperspectral filter array, wherein the hyperspectral array is divided into a plurality of pixels and the optical non-uniformity is permanently formed in the hyperspectral filter array as plastic deformation resulting in a random formation for each pixel thus resulting in a different spectral response due to a different layered structure for each pixel, wherein transmission spectra from each pixel having the different layered structure, and wherein a pairwise comparison of transmission spectra of any two pixels has an average correlation coefficient less than 0.2.

13. The Anderson localized hyperspectral filter array of claim 12, wherein materials of the plurality of optical layers are selected from substantially transparent materials of a wavelength range of interest.

14. The Anderson localized hyperspectral filter array of claim 13, where in case of visible and infrared wavelength ranges, the relatively transparent materials is selected from the group consisting of low density polyethylene (LDPE), high density polyethylene (HDPE), N-BK7, silica glass (SiO2), Crystal Quartz, CaF2, ZnSe, polysulfide (Sulfur polymer), polymethyl methacrylate (PMMA), benzocyclobutene (BCB) polymer, SU-8, and a combination thereof.

15. The Anderson localized hyperspectral filter array of claim 14, wherein the randomness of thickness of each layer is determined by selecting a random number about a predetermined mean thickness and bounded by a predetermined lower boundary and a predetermined upper boundary.

16. The Anderson localized hyperspectral filter array of claim 15, wherein the predetermined mean thickness is between about ¼ to about 1× of a mean wavelength of a spectral range of interest.

17. The Anderson localized hyperspectral filter array of claim 12, wherein the overall physical thickness in a longitudinal direction is greater than the localization length of light in the hyperspectral filter array.

18. The Anderson localized hyperspectral filter array of claim 12, wherein the plurality of optical layers is deposited on the base layer using a manufacturing method selected from the group consisting of atomic layer deposition, chemical vapor deposition, physical vapor deposition, sputtering, spin-coating, electroplating, and E-beam process.

19. The Anderson localized hyperspectral filter array of claim 12, wherein the base layer is a sacrificial layer and is removed to yield an optical filter comprised of only the plurality of optical layers.

20. The Anderson localized hyperspectral filter array of claim 12, wherein the base layer is one layer from the plurality of optical layers.

21. The Anderson localized hyperspectral filter array of claim 12, wherein the hyperspectral filter array is divided into a plurality of pixels, each pixel defined as a unit area of the hyperspectral filter array.

22. The Anderson localized hyperspectral filter array of claim 21, wherein spectral response for each pixel of the plurality of pixels is characterized and provided with the hyperspectral filter array.

* * * * *